US012794110B2

(12) United States Patent
Chiang et al.

(10) Patent No.: US 12,794,110 B2
(45) Date of Patent: Nov. 10, 2026

(54) ANTENNA PACKAGE STRUCTURE

(71) Applicant: MEDIATEK INC., Hsinchu City (TW)

(72) Inventors: Chung-Hsin Chiang, Hsinchu City (TW); Ya-Jui Hsieh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 132 days.

(21) Appl. No.: 18/797,924

(22) Filed: Aug. 8, 2024

(65) Prior Publication Data

US 2025/0062521 A1 Feb. 20, 2025

Related U.S. Application Data

(60) Provisional application No. 63/519,852, filed on Aug. 16, 2023.

(51) Int. Cl.
*H01Q 1/22* (2006.01)
*H01Q 1/48* (2006.01)

(52) U.S. Cl.
CPC ............. *H01Q 1/2283* (2013.01); *H01Q 1/48* (2013.01)

(58) Field of Classification Search
CPC .......... H01Q 1/2283; H01Q 1/40; H01Q 1/48; H01Q 21/065
See application file for complete search history.

(56) References Cited

U.S. PATENT DOCUMENTS

| | | | | |
|---|---|---|---|---|
| 9,306,291 | B2 * | 4/2016 | Lu | H01Q 21/06 |
| 12,126,071 | B2 * | 10/2024 | Yeon | H01Q 21/08 |
| 12,537,288 | B2 * | 1/2026 | Suh | H01Q 1/2283 |
| 2016/0322707 | A1 | 11/2016 | Nair | |
| 2020/0203817 | A1 | 6/2020 | Chiang | |
| 2021/0366838 | A1 | 11/2021 | Han | |
| 2022/0368003 | A1 | 11/2022 | Chiang | |
| 2023/0083146 | A1 * | 3/2023 | We | H01Q 1/2283 |
| 2023/0097074 | A1 | 3/2023 | Wang | |
| 2023/0154825 | A1 * | 5/2023 | Tong | H10W 40/254 257/659 |
| 2023/0163475 | A1 | 5/2023 | Cho | |
| 2023/0209730 | A1 | 6/2023 | Fujii | |
| 2023/0268637 | A1 * | 8/2023 | Dutta | H01Q 1/2283 343/904 |
| 2023/0307817 | A1 * | 9/2023 | Hwang | H01Q 1/2283 |
| 2024/0347913 | A1 * | 10/2024 | Dutta | H01Q 1/2283 |
| 2024/0373752 | A1 * | 11/2024 | Chen | H10N 30/706 |
| 2026/0016856 | A1 * | 1/2026 | Dou | G06F 1/163 |

OTHER PUBLICATIONS

Extended European Search Report dated Dec. 18, 2024, issued in application No. EP 24194177.2.

* cited by examiner

*Primary Examiner* — Thien M Le

(74) *Attorney, Agent, or Firm* — McClure, Qualey & Rodack, LLP

(57) ABSTRACT

An antenna package structure includes a substrate, an antenna tuner, a communication device, and an antenna layer. The antenna tuner is disposed on a top surface of the substrate. The communication device is disposed on a bottom surface of the substrate. The antenna layer vertically overlaps the antenna tuner and includes a dielectric layer and an antenna element. The antenna element is disposed in the dielectric layer and is electrically coupled to the substrate.

19 Claims, 18 Drawing Sheets

ANTENNA PACKAGE STRUCTURE

CROSS REFERENCE TO RELATED APPLICATIONS

This application claims the benefit of U.S. Provisional Application No. 63/519,852 filed on Aug. 16, 2023, the entirety of which is incorporated by reference herein.

BACKGROUND OF THE INVENTION

Field of the Invention

The present invention relates to semiconductor technology, and, in particular, to an antenna package structure.

Description of the Related Art

Wireless communication devices are increasingly popular and increasingly complex. The wireless communication devices typically include antennas to support communication over a range of frequencies. In order to integrate one or more antenna with other electric circuits in the same package, the antenna-in-package (AiP) technology is often used. The AiP technology that implements the antenna integrated into a semiconductor package structure can balance antenna performance, cost and reduction of the device size. For example, integrating the antenna and an RF chip in the same unit can boost the signal and reduce the transfer losses.

Although existing antenna package structures generally meet requirements, they have not been satisfactory in all respects. With the trend of miniaturization of electronic products, it is necessary to continuously reduce the size of the antenna package structures. Therefore, further improvements in antenna package structures are required.

BRIEF SUMMARY OF THE INVENTION

Antenna package structures are provided. An exemplary embodiment of an antenna package structure includes a substrate, an antenna tuner, a communication device, and an antenna layer. The antenna tuner is disposed on a top surface of the substrate. The communication device is disposed on a bottom surface of the substrate. The antenna layer vertically overlaps the antenna tuner and includes a dielectric layer and an antenna element. The antenna element is disposed in the dielectric layer and is electrically coupled to the substrate.

Another embodiment of an antenna package structure includes a substrate, an antenna tuner, a communication device, and an antenna layer. The antenna tuner is disposed over the substrate. The communication device is disposed below the substrate. The antenna layer is disposed over and separated from the antenna tuner. The antenna layer includes a plurality of dielectric layers and a plurality of antenna elements. The antenna elements are disposed in the dielectric layers and are electrically coupled to the substrate.

Yet another embodiment of an antenna package structure includes a substrate, an antenna tuner, a molding material, and a main radiator. The antenna tuner is disposed on a top surface of the substrate. The molding material surrounds the antenna tuner. The main radiator is disposed over the molding material and is coupled to the substrate. The main radiator partially overlaps the antenna tuner.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
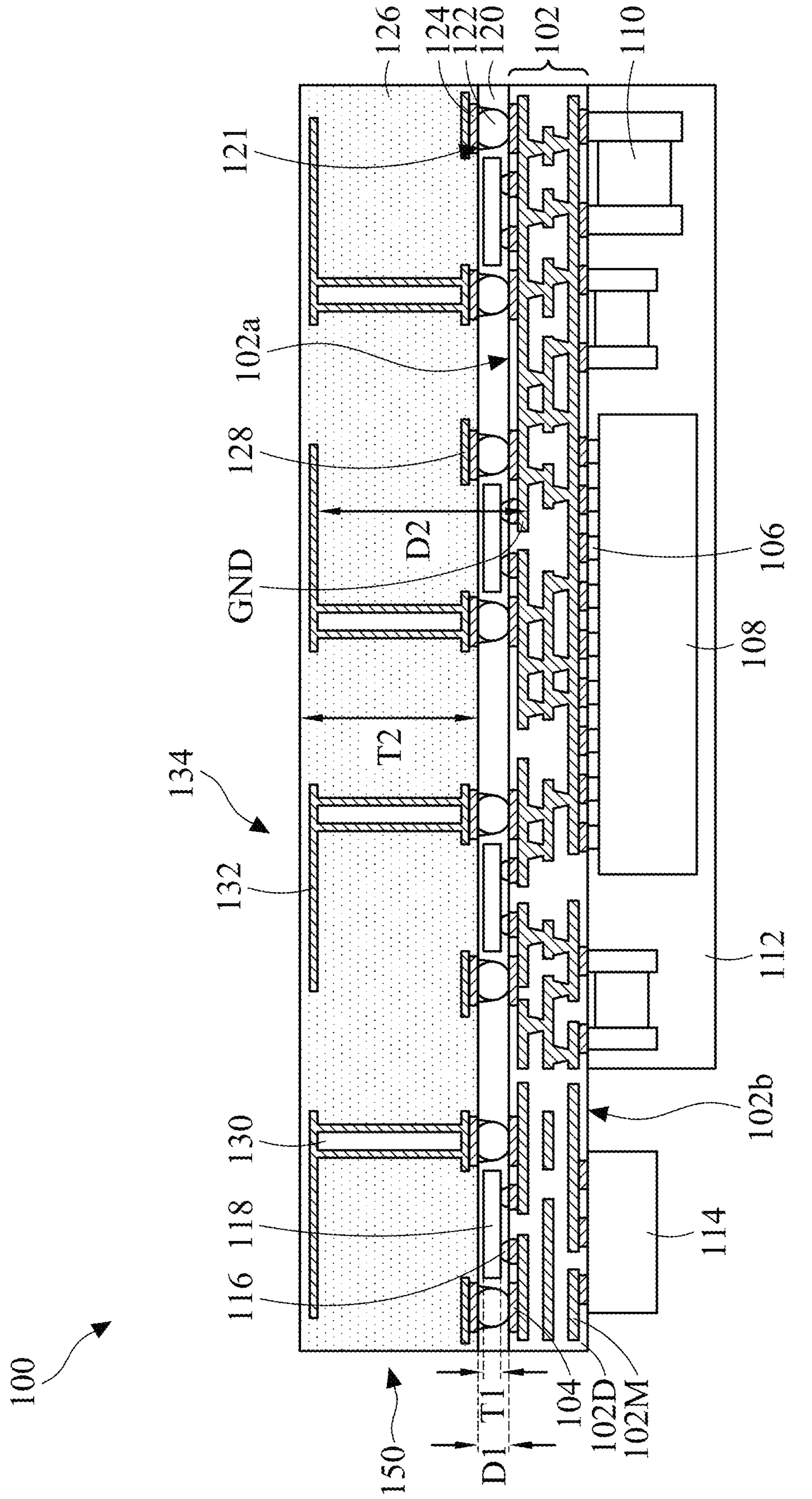
FIGS. 1 to 3 are cross-sectional views of exemplary antenna package structures in accordance with some embodiments of the present disclosure.

The following description is made for the purpose of illustrating the general principles of the invention and should not be taken in a limiting sense. The scope of the invention is best determined by reference to the appended claims.

The present disclosure will be described with respect to particular embodiments and with reference to certain drawings, but the disclosure is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the disclosure.

Additional elements may be added on the basis of the embodiments described below. For example, the description of "a first element on/over a second element" may include embodiments in which the first element is in direct contact with the second element, and may also include embodiments in which additional elements are disposed between the first element and the second element such that the first element and the second element are not in direct contact.

Furthermore, the description of "a first element extending through a second element" may include embodiments in which the first element is disposed in the second element and extends from a side of the second element to an opposite side of the second element, wherein a surface of the first element may be substantially leveled with a surface of the second element, or a surface of the first element may be outside a surface of the second element.

The spatially relative descriptors of the first element and the second element may change as the structure is operated or used in different orientations. In addition, the present disclosure may repeat reference numerals and/or letters in the various embodiments. This repetition is for simplicity and clarity and does not in itself dictate a relationship between the various embodiments discussed.

An antenna package structure including an antenna layer and an antenna tuner is described in accordance with some embodiments of the present disclosure. The antenna tuner may be disposed under the antenna layer. As a result, antenna impedance, frequency, polarization and radiation direction can be modified. In addition, the size of the antenna package structure can be decreased.

FIG. 1 is a cross-sectional view of an antenna package structure 100 in accordance with some embodiments of the present disclosure. Additional features can be added to the antenna package structure 100. Some of the features described below can be replaced or eliminated for different embodiments. To simplify the diagram, only a portion of the antenna package structure 100 is illustrated.

As illustrated in FIG. 1, an antenna package structure 100 includes a substrate 102, in accordance with some embodiments. The substrate 102 may be a package substrate, a carrier board, or any suitable substrate. The substrate 102 may include routing layers 102M disposed in dielectric layers 102D. The dielectric layers 102D may be formed of polymer, including polyimide (PI), polybenzoxazole (PBO), benzocyclobutene (BCB), epoxy, ceramic, the like, or a combination thereof. Alternatively, the dielectric layers 102D may be formed of silicon oxide, silicon nitride, silicon oxynitride, the like, or a combination thereof.

The routing layers 102M may include horizontal interconnects, such as conductive layers or conductive pads, and vertical interconnects, such as conductive vias. The conductive vias may electrically couple different levels of the conductive layers and the conductive pads. The routing layers 102M may be formed of metal, including tungsten, titanium, tantalum, ruthenium, cobalt, copper, aluminum, platinum, tin, silver, gold, the like, an alloy thereof, or a combination thereof.

The substrate 102 may have a first surface 102*a* and a second surface 102*b* opposite the first surface 102*a*. For example, the first surface 102*b* may be at the backside of the substrate 102, and the second surface 102*b* may be at the frontside of the substrate 102, or vice versa. A plurality of conductive pads 104 may be formed on the first surface 102*a* and the second surface 102*b* of the substrate 102 and electrically coupled to the routing layers 102M. The conductive pads 104 may be formed of a material similar to that of the routing layers 102M.

Then, a communication device 108 is mounted on the second surface 102*b* of the substrate 102, in accordance with some embodiments. The communication device 108 may include a radio-frequency integrated circuit (RFIC) or any suitable device.

The communication device 108 may be electrically coupled to the conductive pads 104 through a plurality of conductive connectors 106. The conductive connectors 106 may include microbumps, controlled collapse chip connection (C4) bumps, conductive pillars, solder paste, ball grid array (BGA) balls, frame board, the like, or a combination thereof. The conductive connectors 106 may be formed of metal, including tungsten, titanium, tantalum, ruthenium, cobalt, copper, aluminum, platinum, tin, silver, gold, the like, an alloy thereof, or a combination thereof.

One or more electronic components 110 are mounted adjacent to the communication device 108, in accordance with some embodiments. The electronic components 110 may be electrically coupled to the routing layer 102M. The electronic components 110 may include passive component, including resistor, inductor, capacitor, or a combination thereof.

Then, an underfill material (not illustrated) may be formed to surround each of the conductive connectors 106 and may be used to fill in the gaps between the conductive connectors 106 to provide structural support. The underfill material may include polymer, such as epoxy. The underfill material may be dispensed with capillary force, and then may be cured through any suitable curing process. The underfill material is optional according to embodiments of the present disclosure.

Then, a molding material 112 is formed on the second surface 102*b* of the substrate 102 to encapsulate the communication device 108, the electronic components 110, and the underfill material (if exists), in accordance with some embodiments. The molding material 112 may protect these components from the environment, thereby protecting them from damage due to stress, chemicals, and moisture. The molding material 112 may be formed of a non-conductive material, including moldable polymer, epoxy, resin, the like, or a combination thereof.

The molding material 112 may partially cover the second surface 102*b* of the substrate 102 as illustrated in FIG. 1. In such embodiments, a connector 114 is disposed on the exposed portion of the second surface 102*b* of the substrate 102. The connector 114 may be electrically coupled to the routing layer 102M, and may be electrically coupled to the communication device 108 and/or the electronic components 110 through the routing layer 102M. The antenna package structure 100 may be electrically coupled to other electronic components such as a printed circuit board (PCB) or any suitable component (not illustrated) through the connector 114.

Then, a plurality of antenna tuners 118 are mounted on the first surface 102*a* of the substrate 102, in accordance with some embodiments. The antenna tuners 118 may each independently include an aperture tuner, an impedance tuner, a phase shifter, a switch (such as a single-pole, single-throw (SPST) switch), a transformer, a tuning capacitor, a tuning inductor, an open circuit, a short circuit, a delay line, or any suitable components. For example, one of the antenna tuners 118 may include a SPST switch, a tuning capacitor, and a delay line. The antenna tuners 118 can change the antenna states depending upon the RF environment, such as antenna impedance, operating frequency, polarization direction, radiation directions, or a combination thereof.

In some embodiments, the components of the antenna tuner 118 are all disposed over the substrate 102. In some other embodiments, one or more components of the antenna tuner 118 are disposed in the substrate 102, and these components may be formed during the formation of the routing layers 102M. For example, the antenna tuner 118 may include a SPST switch and a tuning capacitor disposed over the substrate 102, and may include a delay line disposed in the substrate 102.

The communication device 108 and the antenna tuners 118 may be stacked in the vertical direction (such as the direction vertical the first surface 102*a* of the substrate 102), so that the double side mounting (and/or double side molding) SiP can be achieved. The antenna tuners 118 may be mounted onto the substrate 102 during mounting the communication device 108 and the electronic components 110. Alternatively, the antenna tuners 118, the communication device 108, and the electronic components 110 may each be mounted onto the substrate 102 in different processes.

The antenna tuners 118 may be electrically coupled to the conductive pads 104 through a plurality of conductive connectors 116. The conductive connectors 116 may be electrically coupled to the routing layers 102M. The conductive connectors 116 may include microbumps, controlled collapse chip connection (C4) bumps, conductive pillars, solder balls, solder paste, ball grid array (BGA) balls, frame board, the like, or a combination thereof. The conductive connectors 116 may be formed of metal, including the material similar to that of the conductive connectors 106.

Then, similar to those discussed above, an underfill material (not illustrated) may be formed to surround each of the conductive connectors 116 and may be used to fill the gaps between the conductive connectors 116 to provide structural support. The underfill material is optional. The underfill material surrounding the conductive connectors 116 may be formed before, during, or after the formation of the underfill material surrounding the conductive connectors 106.

Then, an encapsulating material 120 is formed on the first surface 102*a* of the substrate 102 to encapsulate the antenna tuners 118, in accordance with some embodiments. The encapsulating material 120 may surround each of the antenna tuners 118 and may cover or expose the top surfaces of the antenna tuners 118. The encapsulating material 120 may be formed before, during, or after the formation of the molding material 112. The encapsulating material 120 may include a molding material, an underfill material, or a combination thereof. The encapsulating material 120 may be formed of the material similar to that of the molding material 112 and/or the underfill material discussed previously, and will not be repeated. The sidewalls of the encapsulating material 120 may be substantially aligned with the sidewalls of the substrate 102. A sidewall of the encapsulating material 120 may be substantially aligned with a sidewall of molding material 112.

Then, a plurality of openings 121 are formed in the encapsulating material 120, in accordance with some embodiments. The openings 121 may be formed through the encapsulating material 120 and may expose the conductive pads 104 by laser drilling or any suitable methods. The openings 121 may have a width decreasing toward the substrate 102.

Then, an antenna layer 150 is mounted on the first surface 102*a* of the substrate 102 through a plurality of conductive connectors 122, in accordance with some embodiments. The conductive connectors 122 may be disposed in the openings 121 of the encapsulating material 120. The conductive connectors 122 may include microbumps, controlled collapse chip connection (C4) bumps, conductive pillars, solder balls, solder paste, ball grid array (BGA) balls, frame board, the like, or a combination thereof. The conductive connectors 122 may be electrically coupled to the routing layers 102M. The conductive connectors 122 may be formed of metal, including the material similar to that of the conductive connectors 106.

The conductive connectors 122 may have a dimension (such as thickness or width) greater than a dimension (such as thickness or width) of the conductive connectors 116. The distance D1 between the antenna layer 150 and the substrate 102 may be greater than the thickness T1 of the antenna tuners 118 to accommodate the antenna tuners 118. In particular, the thickness of one of the conductive connectors 122 may be greater than the sum of the thickness of one of the conductive connectors 116 and the thickness T1 of the antenna tuners 118.

The antenna layer 150 includes a dielectric layer 126, a plurality of conductive pads 124, and a plurality of antenna elements 134, in accordance with some embodiments. The conductive pads 124 and the antenna elements 134 may be disposed in the dielectric layer 126. The dielectric layer 126 may be formed of polymer, including polyimide (PI), polybenzoxazole (PBO), benzocyclobutene (BCB), epoxy, the like, or a combination thereof. Alternatively, the dielectric layer 126 may be formed of silicon oxide, silicon nitride, silicon oxynitride, the like, or a combination thereof.

The sidewalls of the encapsulating material 120 may be substantially aligned with the sidewalls of the dielectric layer 126. The dielectric layer 126 may be spaced apart from the antenna tuners 118 by the encapsulating material 120.

The conductive pads 124 may be disposed in the bottom portion of the dielectric layer 126, which is close to the substrate 102. The conductive pads 124 may be electrically coupled the routing layers 102M through the conductive connectors 122. The conductive pads 124 may be formed of metal, including the material similar to that of the conductive pads 104.

Each of the antenna elements 134 may include a conductive line 128, an antenna feeding component 130, and a main radiator 132. The conductive line 128 may be disposed over the conductive pads 124. The antenna feeding component 130 may be disposed over the conductive line 128. The main radiator 132 may be disposed in the top portion of the dielectric layer 126, which is away from the substrate 102. Each of the main radiators 132 may be disposed directly above and electrically coupled to one of the antenna feeding components 130, respectively.

The antenna elements 134 may vertically overlap the antenna tuners 118. In particular, each of the main radiators 132 may vertically overlap one of the antenna tuners 118. The projection area of one of the main radiators 132 may overlap with the projection area of one of the antenna tuners 118. As a result, it would be able to modify the antenna impedance, antenna aperture, or a combination thereof. In other words, it would be able to modify the antenna frequency, radiation direction, and polarization direction, which may be referred to as frequency reconfigurable antenna, pattern reconfigurable antenna, or polarization reconfigurable antenna. For example, the antenna radiation direction may include two different directions, such as top and side directions.

One or more main radiators 132 may vertically overlap the communication device 108. The projection area of the main radiator 132 may overlap with the projection area of the communication device 108. Similarly, one or more antenna tuners 118 may vertically overlap the communication device 108. The projection area of the antenna tuner 118 may overlap with the projection area of the communication device 108.

The antenna element 134 may be electrically coupled the routing layers 102M through the conductive connectors 122. In some embodiments, the routing layer 102M include a grounding layer GND. Since the distance D2 between the main radiator 132 and the grounding layer GND is related to the antenna bandwidth, it is necessary to make the distance D2 between the main radiator 132 and the grounding layer GND greater than a certain value. Therefore, the antenna refer to ground in the substrate 102 can reduce the overall height of the antenna package structure 100.

It should be noted the above manufacturing sequence is for illustrative purposes only, and other manufacturing sequence may be utilized without departing from the scope of the present disclosure. For example, the encapsulating material 120 may fill the space between the antenna layer 150 and the substrate 102 after mounting the antenna layer 150 onto the substrate 102.

Figure 2:
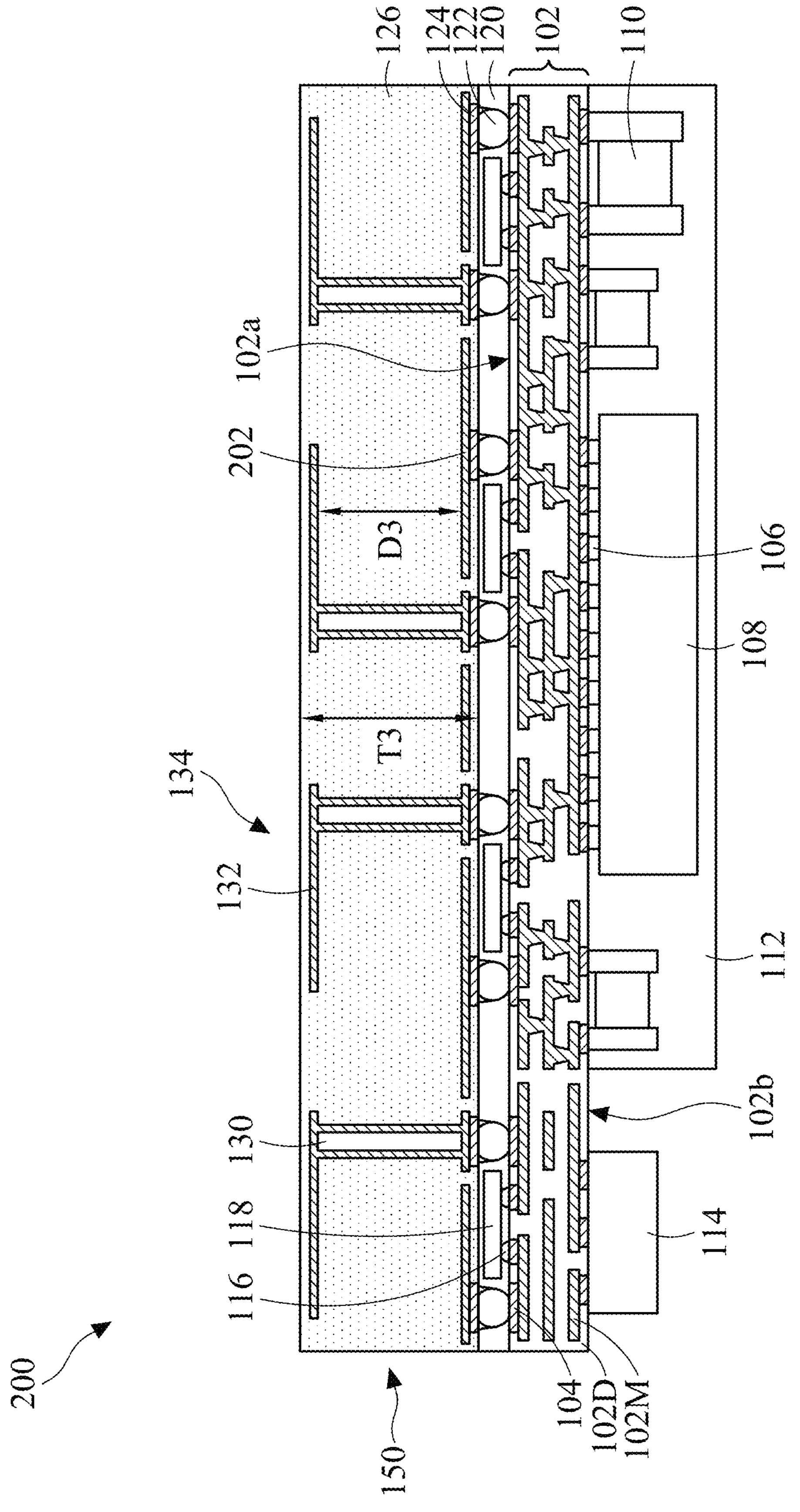

FIG. 2 is a cross-sectional view of an antenna package structure 200 in accordance with some embodiments of the present disclosure. It should be noted that the antenna package structure 200 may include the same or similar components as those of the antenna package structure 100, which is illustrated in FIG. 1, and for the sake of simplicity, those components will not be discussed in detail again. In the following embodiments, a grounding layer 202 is disposed in the antenna layer 150.

As illustrated in FIG. 2, a grounding layer 202 is embedded in the dielectric layer 126, in accordance with some embodiments. The grounding layer 202 may be disposed over and electrically coupled to the conductive pads 124. Since it is necessary to make the distance D3 between the main radiator 132 and the grounding layer 202 greater than a certain value, the grounding layer 202 formed in the dielectric layer 126 increases the thickness T3 of the dielectric layer 126. As a result, the thickness T3 of the dielectric layer 126 in the antenna package structure 200 may be greater than the thickness T2 of the dielectric layer 126 in the antenna package structure 100.

Figure 3:
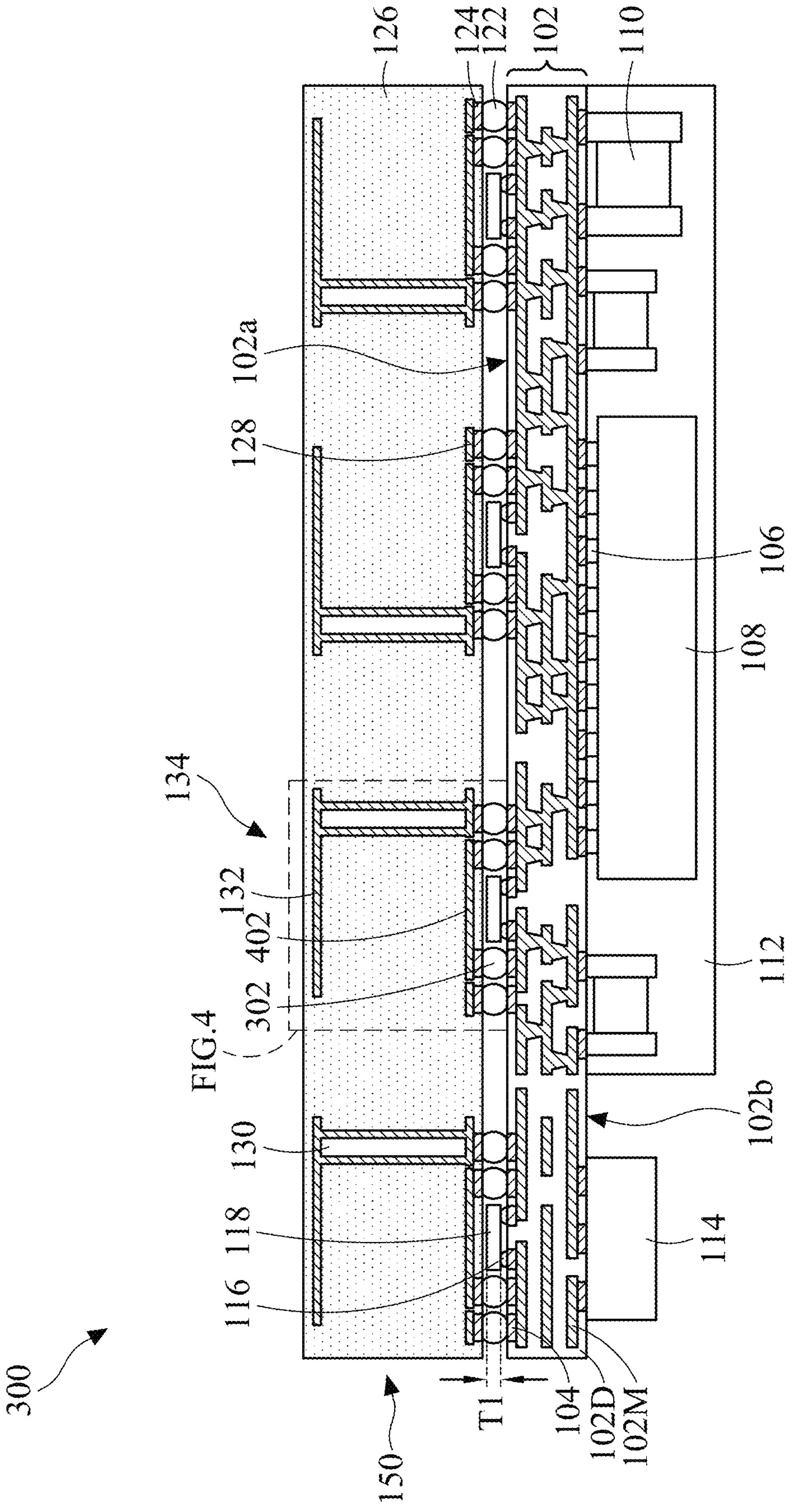

FIG. 3 is a cross-sectional view of an antenna package structure 300 in accordance with some embodiments of the present disclosure. It should be noted that the antenna package structure 300 may include the same or similar components as those of the antenna package structure 100, which is illustrated in FIG. 1, and for the sake of simplicity, those components will not be discussed in detail again. In the following embodiments, the encapsulating material is not formed between the antenna layer 150 and the substrate 102.

As illustrated in FIG. 3, the antenna tuners 118 and the conductive connectors 122 are exposed. The antenna layer 150 may be separated from the antenna tuners 118. In particular, the bottom surface of the antenna layer 150 may be higher than the top surface of the antenna tuners 118.

In some embodiments, the thickness T1 of each of the antenna tuners 118 is decreased to reduce the silicon die conductivity loss of the antenna tuners 118 caused by the coupling of the main radiator 132. In some other embodiments, a metal layer 402 is disposed on the bottom surface of the dielectric layer 126 over a plurality of conductive connectors 302 to isolate the coupling paths from the main radiator 132 to the antenna tuners 118. The conductive connectors 302 may be formed of the material similar to that of the conductive connectors 122, and will not be repeated. Each of the conductive connectors 302 may be disposed along an edge of the antenna tuner 118. The metal layer 402 may be electrically coupled to the routing layers 102M through the conductive connectors 302. The metal layer 402 may be discussed further with reference to FIG. 4.

Figure 4:
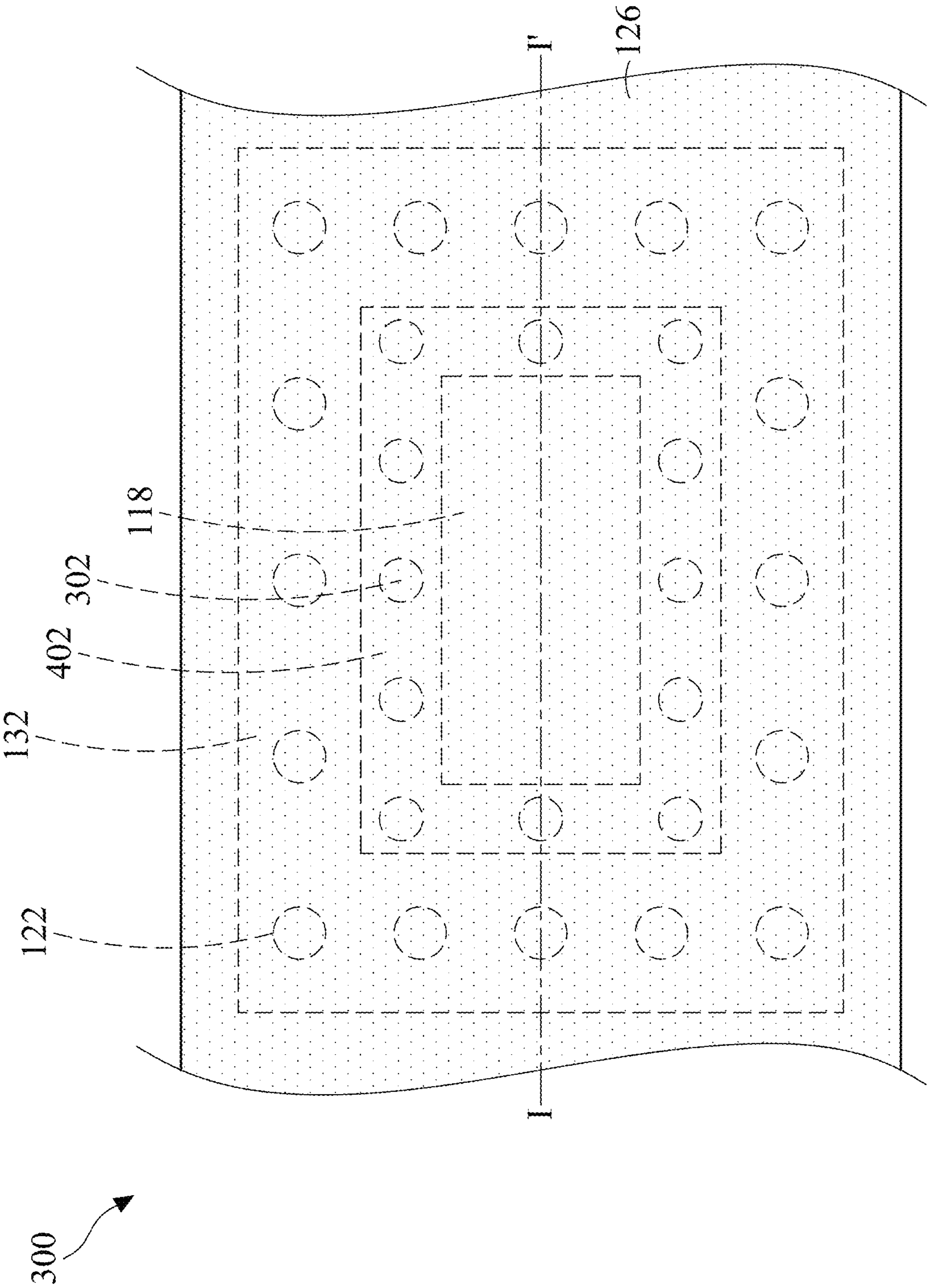
FIG. 4 is a fragmentary top view of an exemplary antenna package structure in accordance with some embodiments of the present disclosure.

FIG. 4 is a fragmentary top view of the antenna package structure 300 in accordance with some embodiments of the present disclosure. A portion of the antenna package structure 300 in FIG. 3 indicated by a dashed line is a cross-sectional view taken along line I-I' shown in FIG. 4. To simplify the diagram, only a portion or several elements of the semiconductor package structure 300 are illustrated in FIG. 4.

As illustrated in FIG. 4, the conductive connectors 122 may surround the conductive connectors 302, and the conductive connectors 302 may surround the antenna tuner 118. A metal layer 402 is disposed over the conductive connectors 302, in accordance with some embodiments. The metal layer 402 may be disposed in the dielectric layer 126 and between the antenna tuner 118 and the main radiator 132. The metal layer 402 may vertically overlap the antenna tuner 118.

Figure 5:
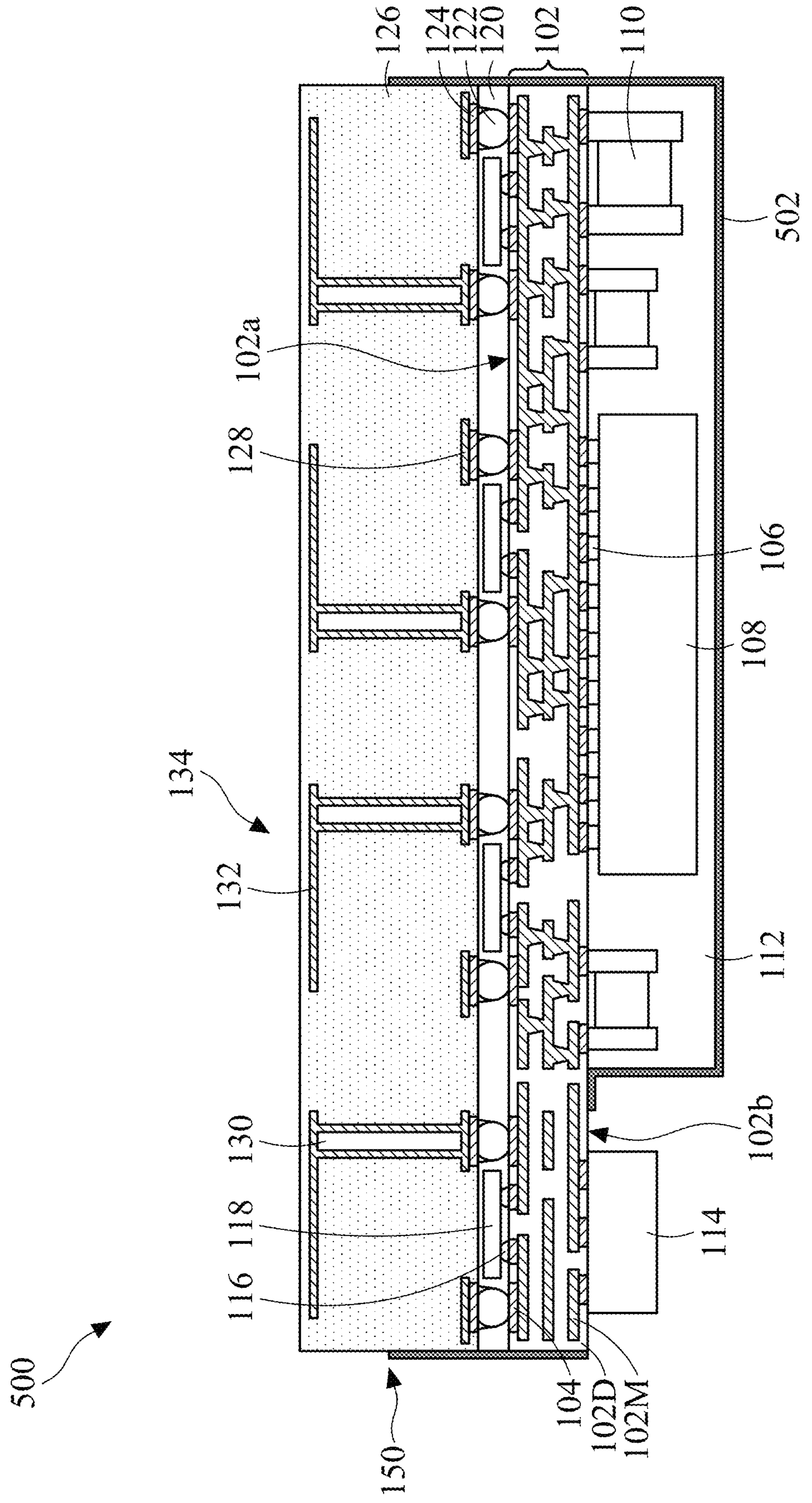
FIGS. 5 to 13 are cross-sectional views of exemplary antenna package structures in accordance with some embodiments of the present disclosure.

FIG. 5 is a cross-sectional view of an antenna package structure 500 in accordance with some embodiments of the present disclosure. It should be noted that the antenna package structure 500 may include the same or similar components as those of the antenna package structure 100, which is illustrated in FIG. 1, and for the sake of simplicity, those components will not be discussed in detail again. In the following embodiments, a shielding layer 502 is formed on the sidewalls of the antenna layer 150.

As illustrated in FIG. 5, a shielding layer 502 is formed on the sidewalls of the substrate 102, the antenna layer 150, the molding material 112, and the encapsulating material 120 for electromagnetic interference (EMI) shielding, in accordance with some embodiments. The shielding layer 502 may be formed by sputtering metal or any suitable material. The shielding layer 502 may be formed after mounting the antenna layer 150 and forming the molding material 112, so that the shielding layer 502 may continuously extend from a portion of the sidewall of the antenna layer 150 to the molding material 112.

The shielding layer 502 may cover the bottom surface of the molding material 112. The shielding layer 502 may have a surface substantially aligned with the second surface **102*b* of the substrate 102 on an edge of the substrate 102. The shielding layer 502 may partially cover the second surface 102*b* of the substrate 102. A portion of the second surface 102*b* of the substrate 102 and the connector 114 may be exposed. The bottom portion of the antenna layer 150 may be surrounded by the shielding layer 502, and the top portion and the top surface of the antenna layer 150** may be exposed.

Figure 6:
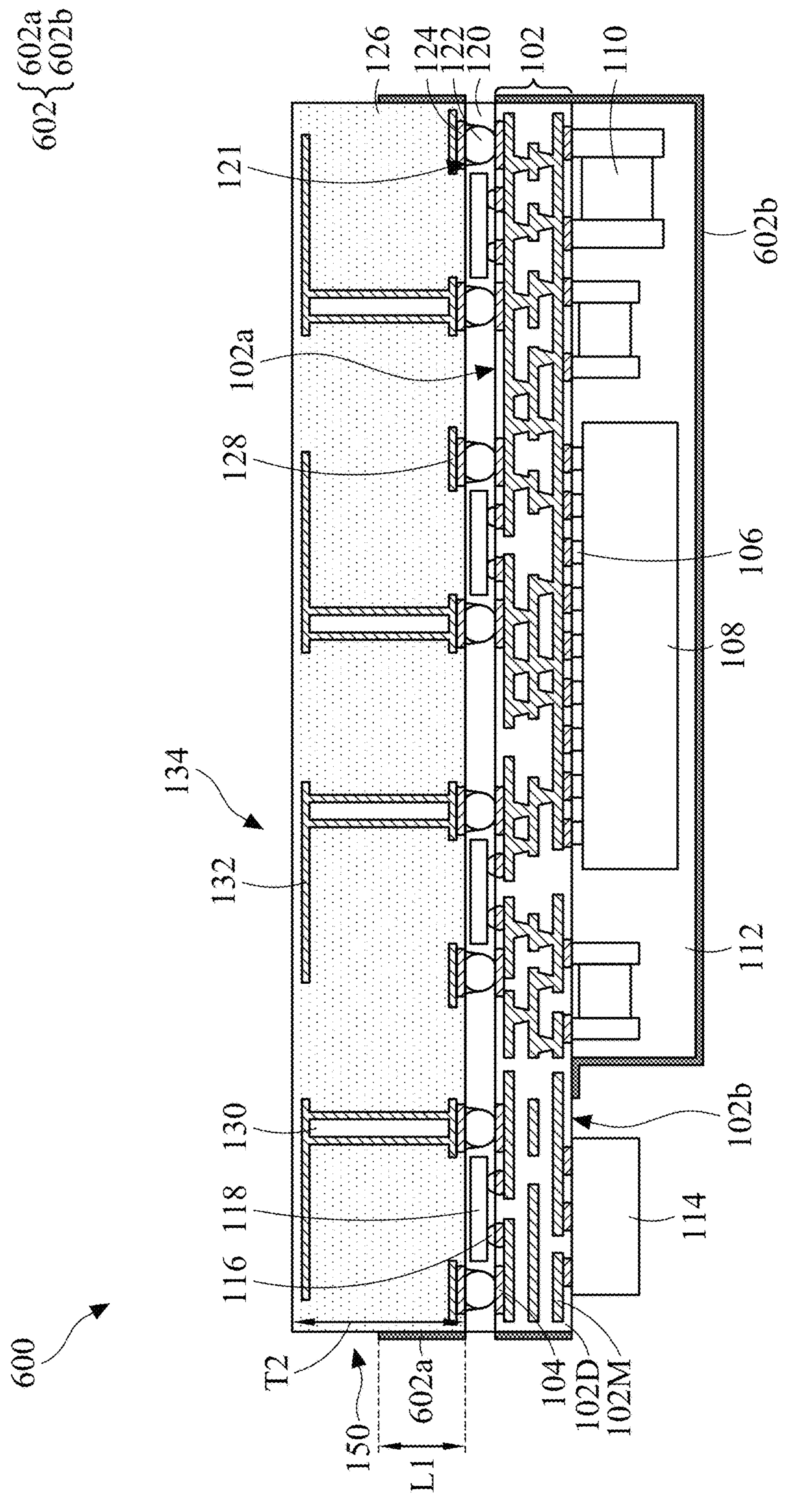

FIG. 6 is a cross-sectional view of an antenna package structure 600 in accordance with some embodiments of the present disclosure. It should be noted that the antenna package structure 600 may include the same or similar components as those of the antenna package structure 500, which is illustrated in FIG. 5, and for the sake of simplicity, those components will not be discussed in detail again. In the following embodiments, a shielding layer 602 is discontinuous on the sidewalls of the encapsulating material 120.

As illustrated in FIG. 6, a shielding layer 602 is formed on the sidewalls of the substrate 102, the antenna layer 150, and the molding material 112, in accordance with some embodiments. The shielding layer 602 may have a first portion **602*a* formed on the sidewalls of the antenna layer 150 and a second portion 602*b* formed on the sidewalls of the substrate 102 and the molding material 112. Then, the antenna layer 150 may be mounted onto the substrate 102 and followed by filling the encapsulating material 120 into the space between the substrate 102 and the antenna layer 150. As such, the shielding layer 602 may not be formed on the sidewalls of the encapsulating material 120 and may be discontinuous. The first portion 602*a* may be separated from the second portion 602*b***.

The first portion **602*a* of the shielding layer 602 may have a bottom surface that is substantially aligned with the bottom surface of the antenna layer 150 on opposite sidewalls of the antenna layer 150. The first portion 602*a* of the shielding layer 602 may have a length L1 in the direction parallel to the sidewall of the dielectric layers 126. The ration of the length L1 of the first portion 602*a* of the shielding layer 602 to the thickness T2 of the dielectric layer 126** may be in a range of about 0.25 to about 0.75, such as about 0.50.

The second portion **602*b* of the shielding layer 602 may continuously extend from the first surface 102*a* of the substrate 102 to the second surface 102*b* of the substrate 102 through the sidewalls and the bottom surface of the molding material 112. The second portion 602*b* of the shielding layer 602 may have a top surface that is substantially aligned with the first surface 102*a* of the substrate 102 and a bottom surface that is substantially aligned with the second surface 102*b* of the substrate 102 on the edge of the substrate 102**.

Figure 7:
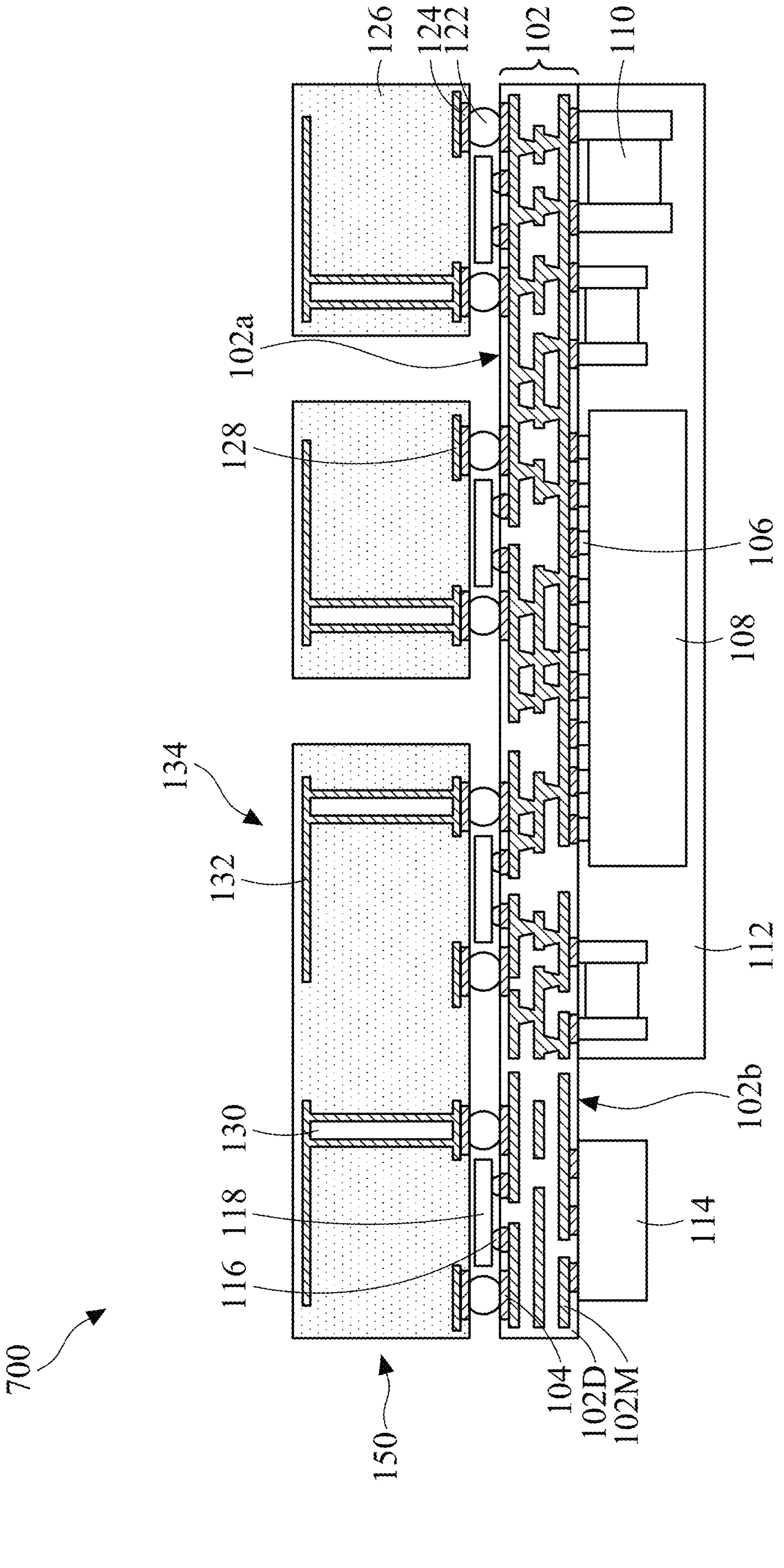

FIG. 7 is a cross-sectional view of an antenna package structure 700 in accordance with some embodiments of the present disclosure. It should be noted that the antenna package structure 700 may include the same or similar components as those of the antenna package structure 100, which is illustrated in FIG. 1, and for the sake of simplicity, those components will not be discussed in detail again. In the following embodiments, the antenna layer 150 includes a plurality of dielectric layers 126.

As illustrated in FIG. 7, the antenna layer 150 includes a plurality of dielectric layers 126 which are discontinuous, in accordance with some embodiments. The dielectric layers 126 may be spaced apart from each other. The dimensions of the dielectric layers 126 (such as the lengths in the direction parallel to the top surface of the dielectric layers 126) may be different, and different numbers of the antenna elements 134 may be disposed in the dielectric layers 126. For example, one or two antenna elements 134 may be disposed in one dielectric layer 126, as shown in FIG. 7. More than two antenna elements 134 may be disposed in one of the dielectric layers 126.

The antenna tuners 118 and the conductive connectors 122 may be exposed. The thicknesses of the antenna tuners 118 may be decreased, or a metal layer may be disposed on the bottom surfaces of the dielectric layers 126 to reduce the silicon die conductivity loss of the antenna tuners 118 caused by the coupling of the main radiator 132, similar to those discussed with reference to FIGS. 3 and 4.

Figure 8:
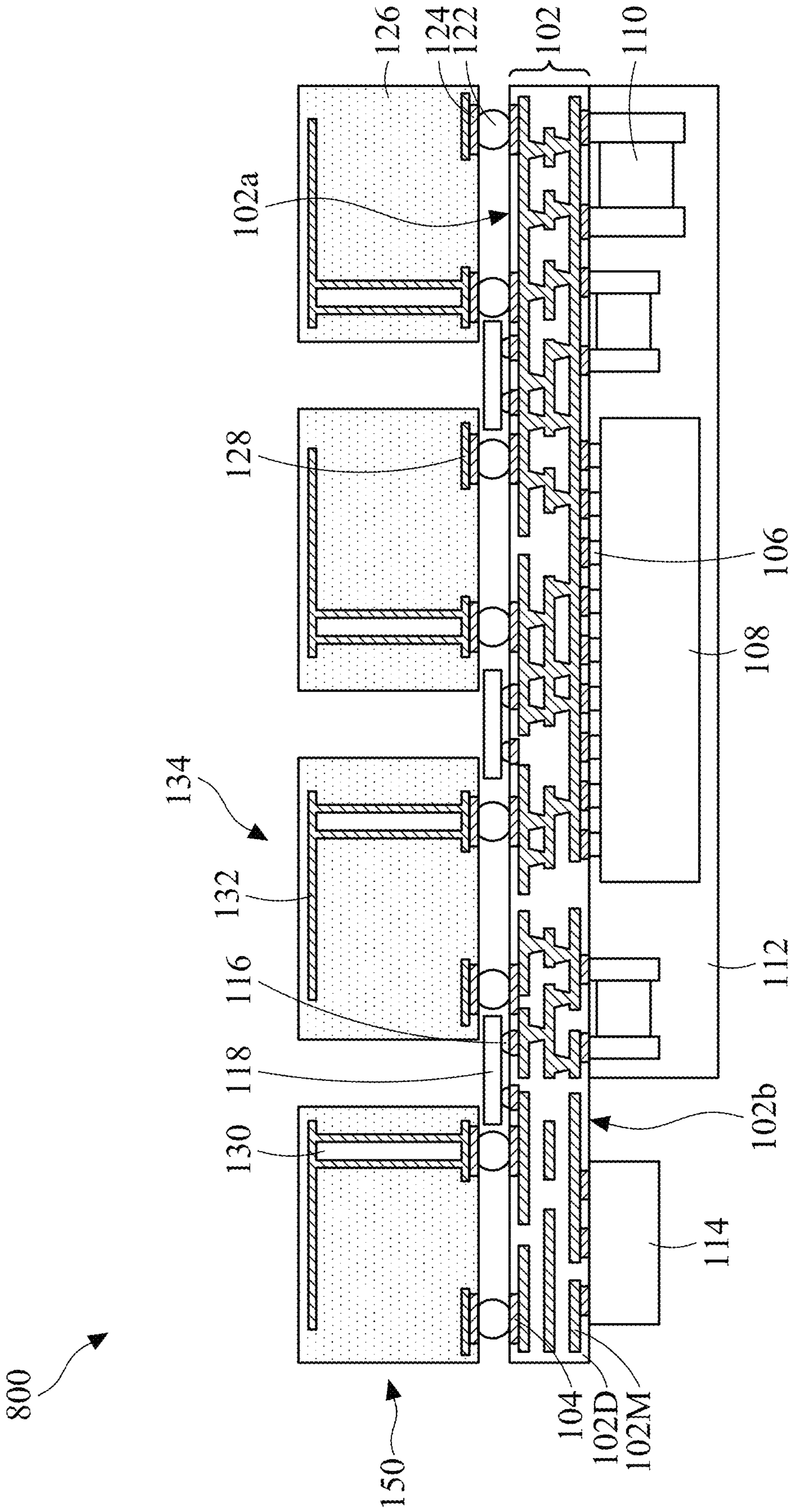

FIG. 8 is a cross-sectional view of an antenna package structure 800 in accordance with some embodiments of the present disclosure. It should be noted that the antenna package structure 800 may include the same or similar components as those of the antenna package structure 700, which is illustrated in FIG. 7, and for the sake of simplicity, those components will not be discussed in detail again. In the following embodiments, each of the antenna tuners 118 is disposed between two of the dielectric layers 126.

As illustrated in FIG. 8, the antenna tuner 118 is disposed between adjacent two of the dielectric layer 126, in accordance with some embodiments. The antenna elements 134 may partially vertically overlap the antenna tuners 118. In particular, each of the main radiators 132 may partially vertically overlap one of the antenna tuners 118. The projection area of one of the main radiators 132 may partially overlap with the projection area of one of the antenna tuners 118.

The antenna tuners 118 and the conductive connectors 122 may be exposed. The thicknesses of the antenna tuners 118 may be decreased, or a metal layer may be disposed on the bottom surfaces of the dielectric layers 126 to reduce the silicon die conductivity loss of the antenna tuners 118 caused by the coupling of the main radiator 132, similar to those discussed with reference to FIGS. 3 and 4.

Figure 9:
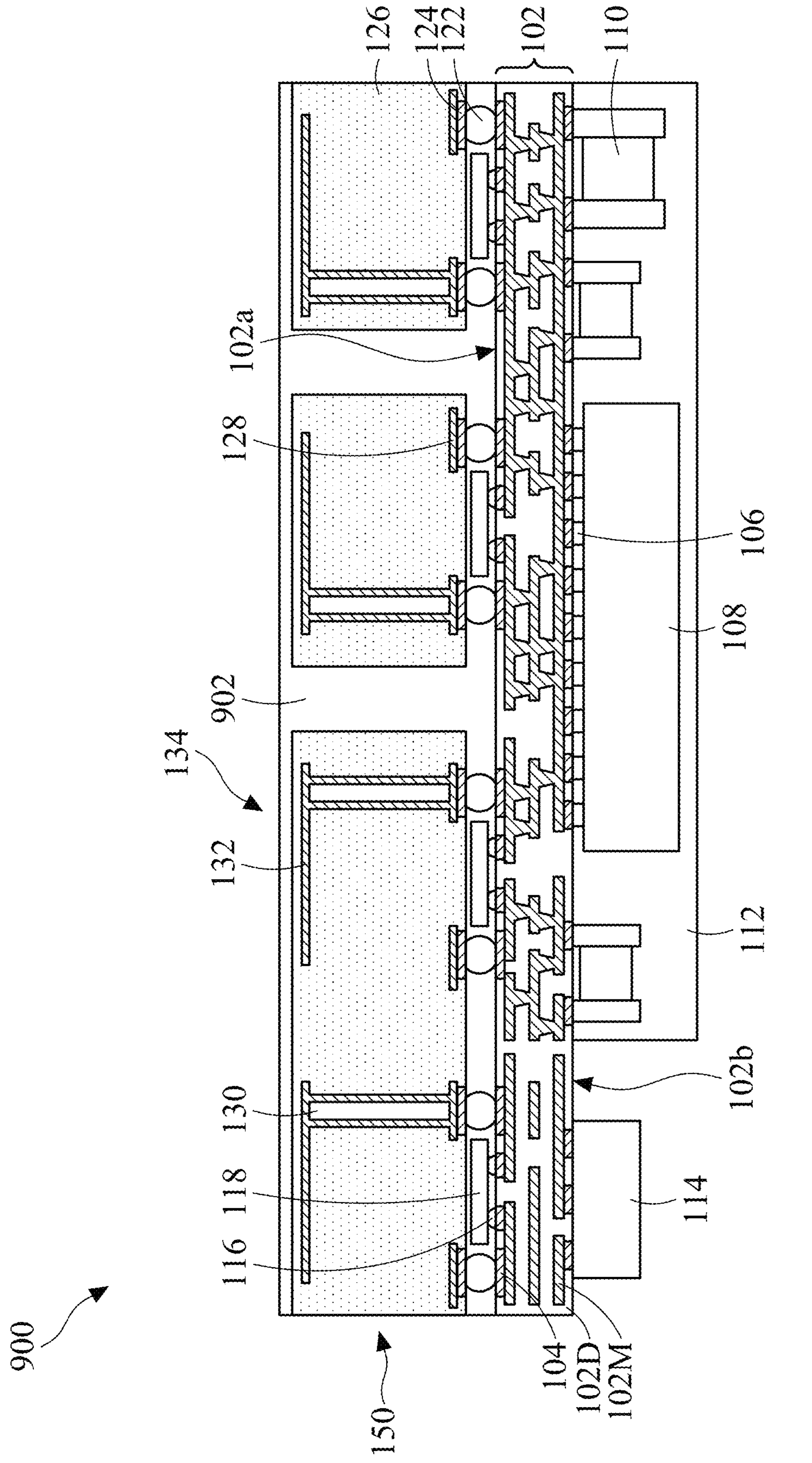

FIG. 9 is a cross-sectional view of an antenna package structure 900 in accordance with some embodiments of the present disclosure. It should be noted that the antenna package structure 900 may include the same or similar components as those of the antenna package structure 700, which is illustrated in FIG. 7, and for the sake of simplicity, those components will not be discussed in detail again. In the following embodiments, a molding material 902 surrounds the dielectric layers 126.

As illustrated in FIG. 9, a molding material 902 is formed on the first surface 102*a* of the substrate 102 to encapsulate the antenna tuners 118 and the dielectric layers 126, in accordance with some embodiments. The molding material 902 may surround each of the antenna tuners 118 and may cover the top surfaces of the antenna tuners 118. The molding material 902 may surround each of the dielectric layers 126 and may cover the top surfaces of the dielectric layers 126.

The molding material 902 may be formed before, during, or after the formation of the molding material 112. The molding material 902 may be formed of the material similar to that of the molding material 112, and will not be repeated. Each of the dielectric layers 126 may be spaced apart from the antenna tuners 118 by the molding material 902.

The sidewalls of the molding material 902 may be substantially aligned with the sidewalls of the substrate 102. The outermost sidewalls of the dielectric layers 126 may be substantially aligned with the sidewalls of the molding material 902, as illustrated. Alternatively, the outermost sidewalls of the dielectric layer 126 may be covered by the molding material 902 in some other embodiments. A sidewall of the molding material 902 may be substantially aligned with a sidewall of molding material 112.

Figure 10:
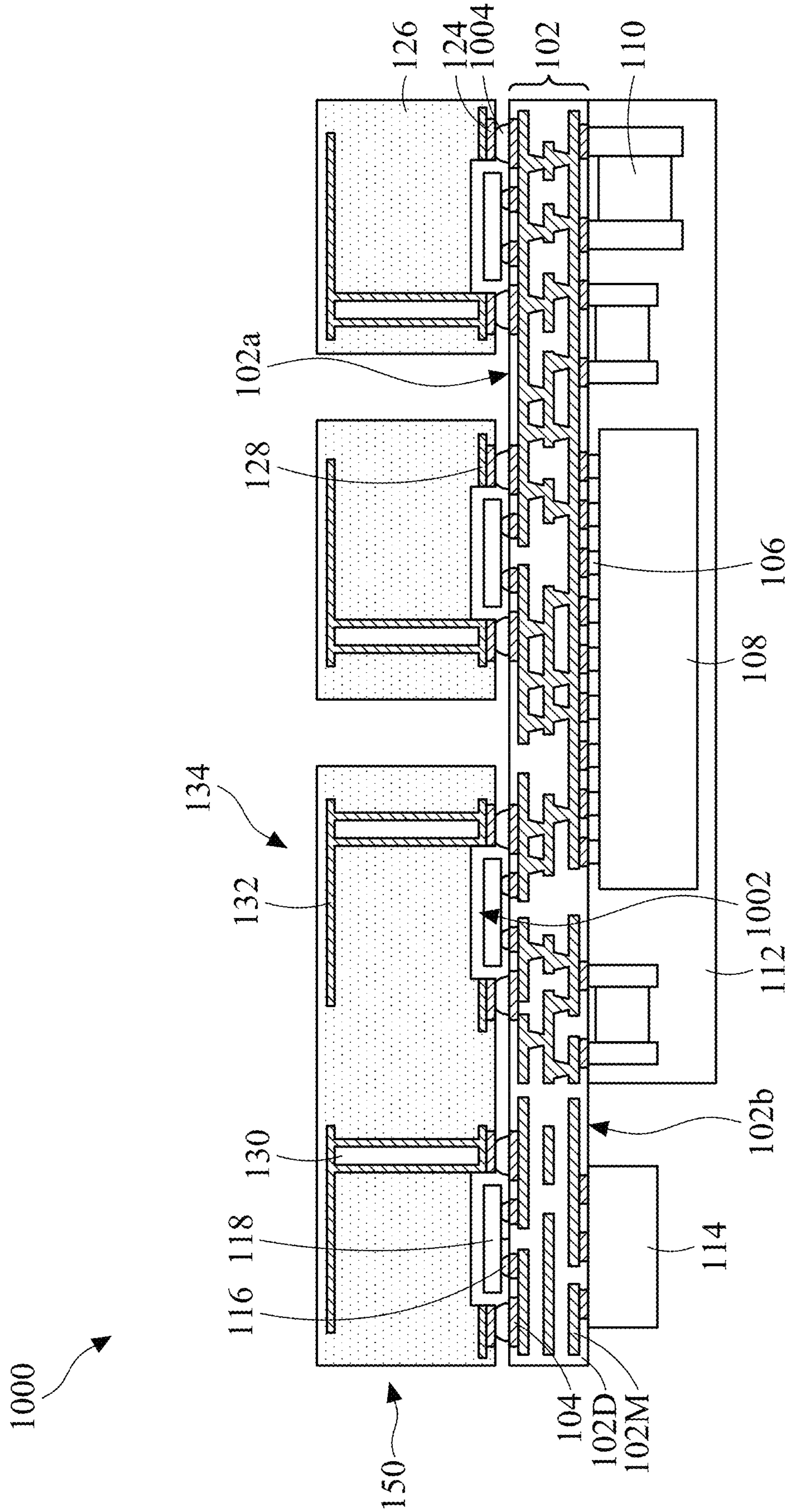

FIG. 10 is a cross-sectional view of an antenna package structure 1000 in accordance with some embodiments of the present disclosure. It should be noted that the antenna package structure 1000 may include the same or similar components as those of the antenna package structure 700, which is illustrated in FIG. 7, and for the sake of simplicity, those components will not be discussed in detail again. In the following embodiments, the dielectric layers 126 include a plurality of recesses 1002.

As illustrated in FIG. 10, a plurality of recesses 1002 are formed in the bottom portions of the dielectric layers 126, in accordance with some embodiments. The recesses 1002 may be formed by laser drilling or any suitable methods. One or more recesses 1002 may be formed in one of the dielectric layers 126 to accommodate one or more antenna tuners 118. As a result, a plurality of conductive connectors 1004 which electrically couple the antenna elements 134 and the routing layers 102M may have a reduced thickness.

The conductive connectors 1004 may include microbumps, controlled collapse chip connection (C4) bumps, conductive pillars, solder balls, solder paste, ball grid array (BGA) balls, frame board, the like, or a combination thereof. The conductive connectors 1004 may be formed of metal, including the material similar to that of the conductive connectors 106.

The antenna tuners 118 and the conductive connectors 122 may be exposed. The thicknesses of the antenna tuners 118 may be decreased, or a metal layer may be disposed on the bottom surfaces of the dielectric layers 126 to reduce the silicon die conductivity loss of the antenna tuners 118 caused by the coupling of the main radiator 132, similar to those discussed with reference to FIGS. 3 and 4.

Figure 11:
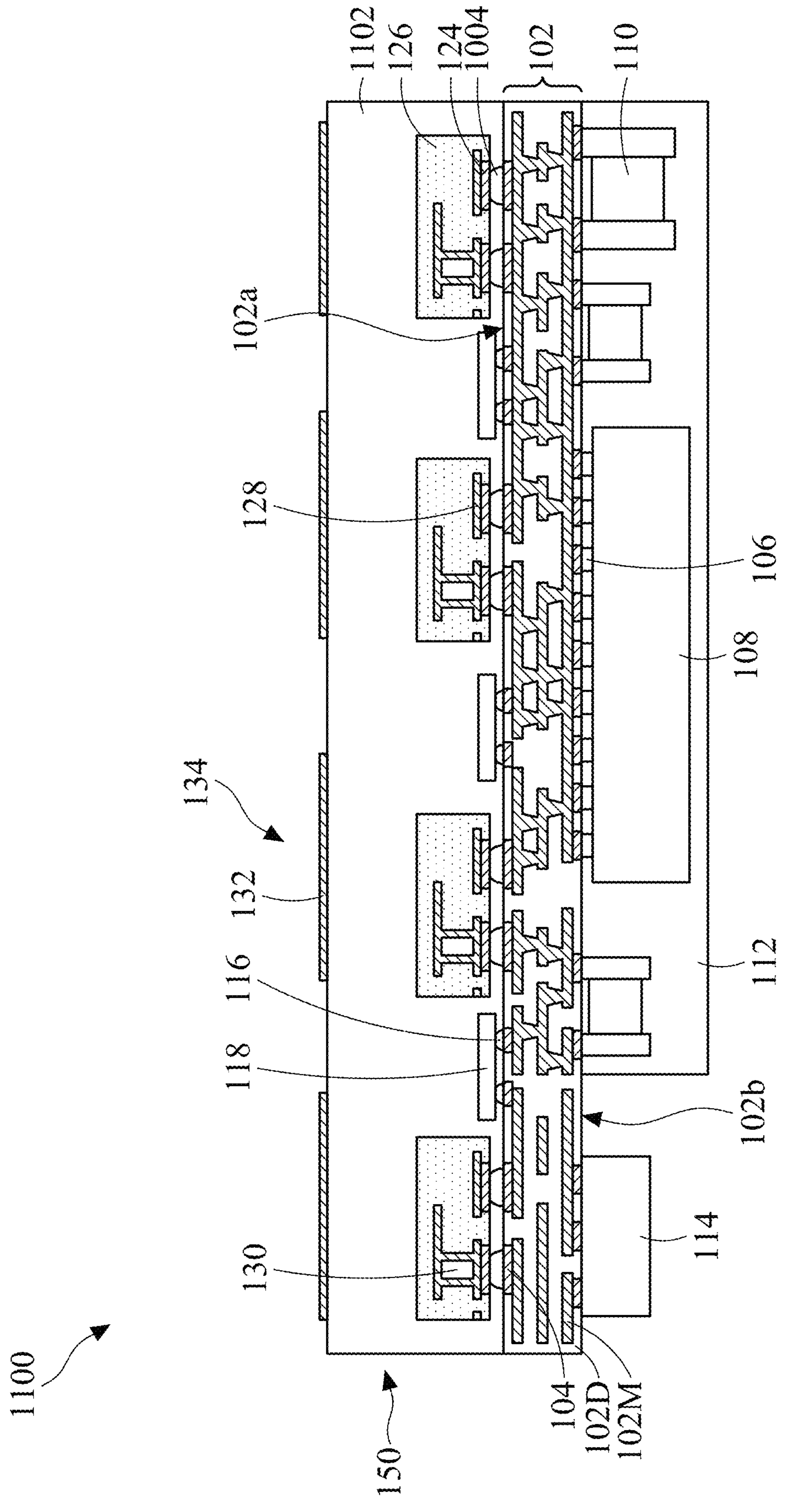

FIG. 11 is a cross-sectional view of an antenna package structure 1100 in accordance with some embodiments of the present disclosure. It should be noted that the antenna package structure 1100 may include the same or similar components as those of the antenna package structure 700, which is illustrated in FIG. 7, and for the sake of simplicity, those components will not be discussed in detail again. In the following embodiments, the main radiator 132 is disposed over a molding material.

As illustrated in FIG. 11, each of the antenna tuners 118 is disposed between two of the dielectric layers 126, in accordance with some embodiments. Since the antenna tuner 118 is disposed outside the sidewalls of the dielectric layers 126, the thickness of the conductive connectors 1004 can be reduced.

A molding material 1102 is disposed on the first surface 102*a* of the substrate 102 to encapsulate the antenna tuners

118 and the dielectric layers 126, in accordance with some embodiments. The molding material 1102 may surround each of the antenna tuners 118 and may cover the top surfaces of the antenna tuners 118. The molding material 1102 may surround each of the dielectric layers 126 and may cover the top surfaces of the dielectric layers 126. The molding material 1102 may be formed before, during, or after the formation of the molding material 112. The molding material 1102 may be formed of the material similar to that of the molding material 112, and will not be repeated.

The main radiator 132 may be disposed outside the dielectric layer 126. Therefore, the thickness of the dielectric layer 126 can be reduced. The main radiators 132 may be spaced apart from the antenna feeding component 130. The main radiator 132 may be formed over the molding material 1102 by printing metal or any suitable methods.

The antenna elements 134 may partially vertically overlap the antenna tuners 118. In particular, each of the main radiators 132 may partially vertically overlap one of the antenna tuners 118. The projection area of one of the main radiators 132 may partially overlap with the projection area of one of the antenna tuners 118.

The sidewalls of the molding material 1102 may be substantially aligned with the sidewalls of the substrate 102. The outermost sidewalls of the dielectric layers 126 may be covered by the molding material 1102. A sidewall of the molding material 1102 may be substantially aligned with a sidewall of the molding material 112.

Figure 12:
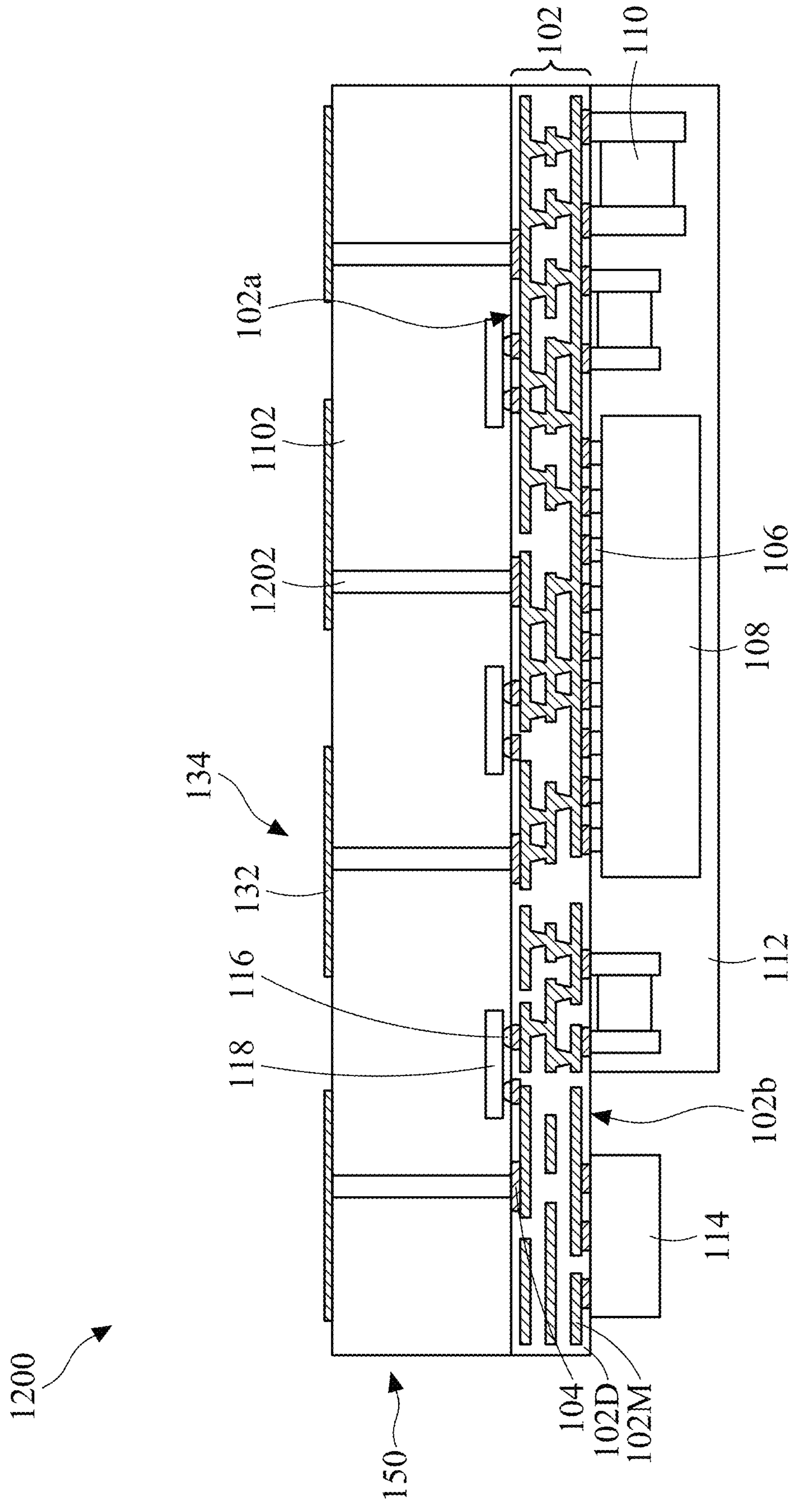

FIG. 12 is a cross-sectional view of an antenna package structure 1200 in accordance with some embodiments of the present disclosure. It should be noted that the antenna package structure 1200 may include the same or similar components as those of the antenna package structure 1100, which is illustrated in FIG. 11, and for the sake of simplicity, those components will not be discussed in detail again. In the following embodiments, the antenna feeding component 1202 includes a through via.

As illustrated in FIG. 12, the antenna feeding component 1202 is disposed in the molding material 1102 and includes a through via, in accordance with some embodiments. The dielectric layer 126 is not disposed. The antenna feeding component 1202 may be formed by drilling the molding material 1102 to form openings extending through the molding material 1102, and then filling the material into the openings. The material of the antenna feeding component 1202 may include metal, such as copper, silver, gold, the like, an alloy thereof, or a combination thereof. The antenna feeding component 1202 may be electrically coupled to the conductive pads 104.

The main radiator 132 may vertically overlap the antenna feeding component 1202. The projection area of the main radiator 132 may overlap with the projection area of the antenna feeding component 1202.

Figure 13:
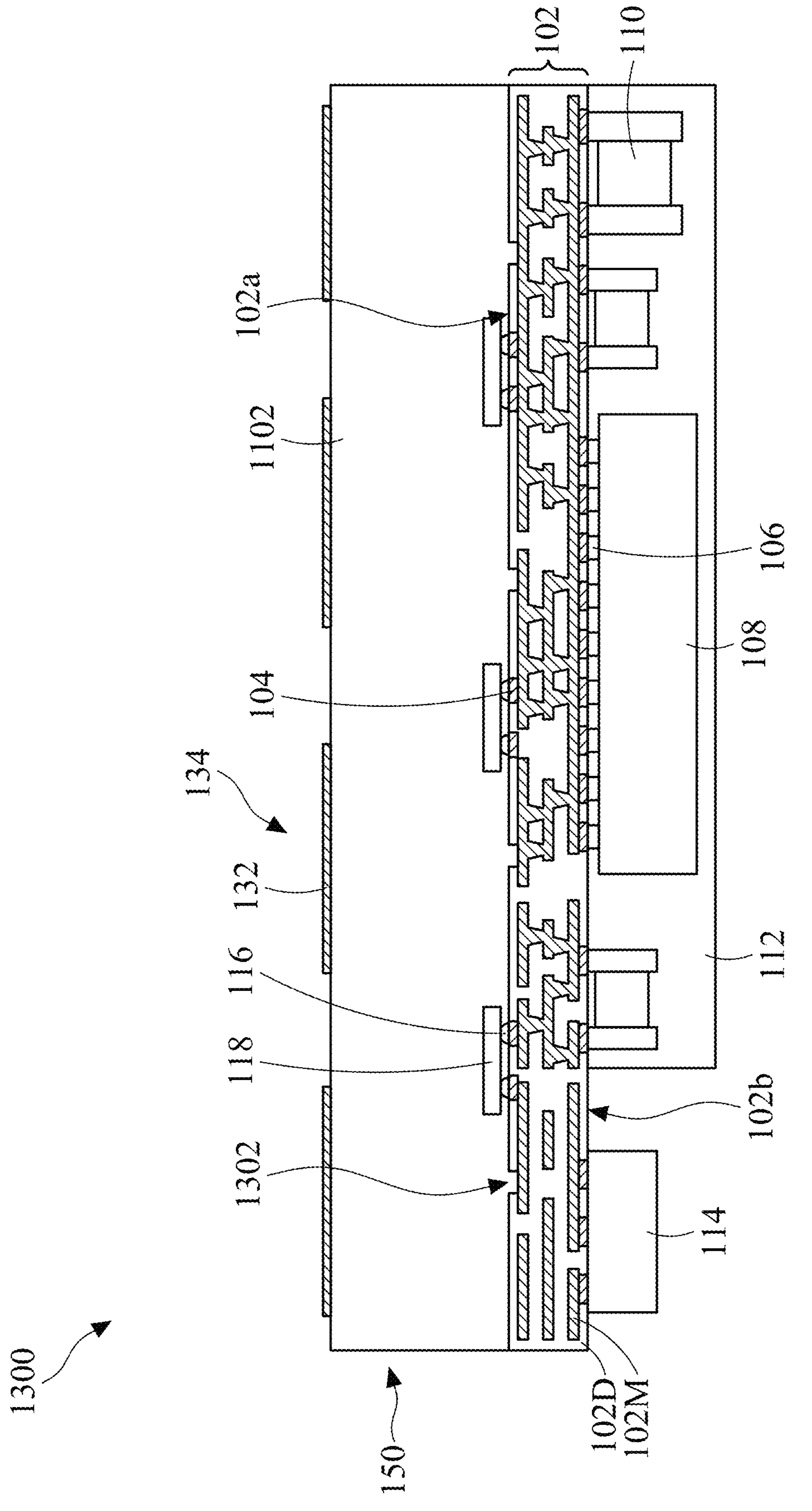

FIG. 13 is a cross-sectional view of an antenna package structure 1300 in accordance with some embodiments of the present disclosure. It should be noted that the antenna package structure 1300 may include the same or similar components as those of the antenna package structure 1100, which is illustrated in FIG. 11, and for the sake of simplicity, those components will not be discussed in detail again. In the following embodiments, the antenna feeding component 1302 includes a coupling slot.

As illustrated in FIG. 13, the antenna feeding component 1302 includes a coupling slot formed on the first surface 102*a* of the substrate 102, in accordance with some embodiments. The routing layer 102M may include a coupling line, and the coupling slot may expose the coupling line in the substrate 102. The main radiator 132 may be coupled to the substrate 102 by using the technique of slot-coupled feed. The dielectric layer 126 is not disposed. The molding material 1102 may extend into the coupling slot. The antenna feeding component 1302 may be discussed further with reference to FIG. 14.

Figure 14:
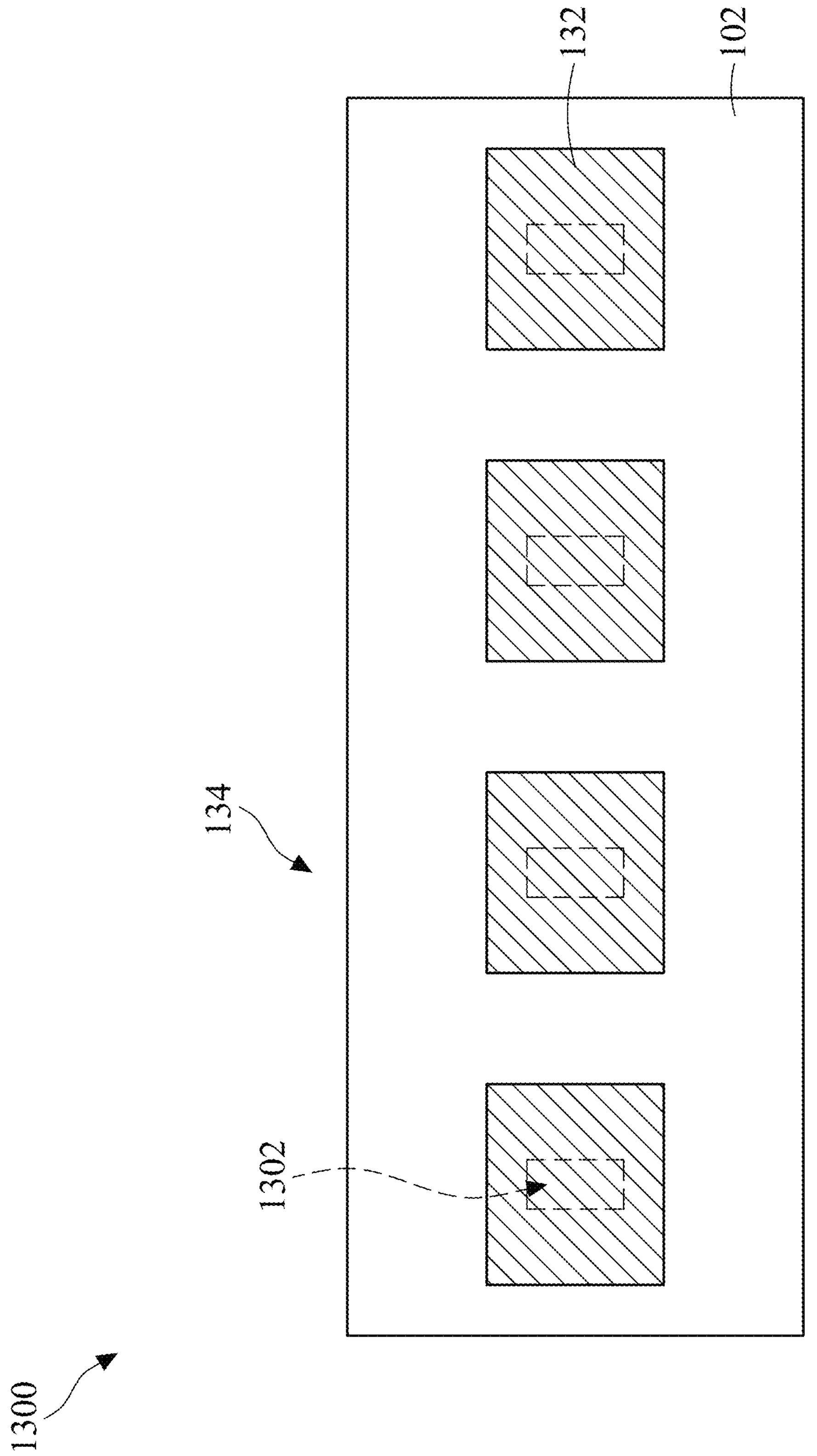
FIG. 14 is a top view of an exemplary antenna package structure in accordance with some embodiments of the present disclosure.

FIG. 14 is a top view of the antenna package structure 1300 in accordance with some embodiments of the present disclosure. To simplify the diagram, only a portion of the semiconductor package structure 1300 is illustrated.

As illustrated in FIG. 14, the antenna feeding component 1302 may be disposed directly below the main radiator 132. The main radiator 132 may vertically overlap the antenna feeding component 1302. The projection area of the main radiator 132 may overlap with the projection area of the antenna feeding component 1302.

Figure 15:
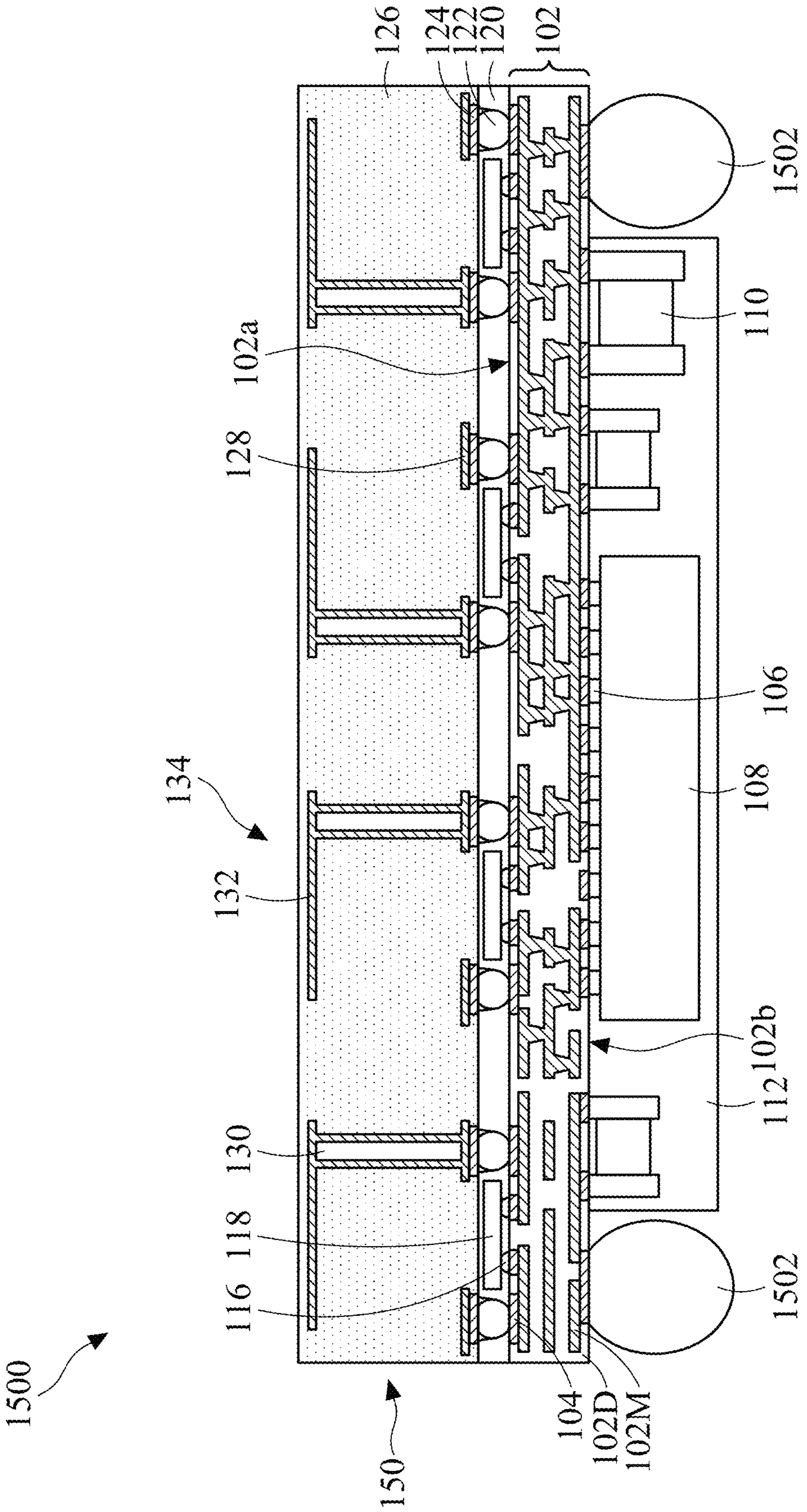
FIGS. 15 to 18 are cross-sectional views of exemplary antenna package structures in accordance with some embodiments of the present disclosure.

FIG. 15 is a cross-sectional view of an antenna package structure 1500 in accordance with some embodiments of the present disclosure. It should be noted that the antenna package structure 1500 may include the same or similar components as those of the antenna package structure 100, which is illustrated in FIG. 1, and for the sake of simplicity, those components will not be discussed in detail again. In the following embodiments, the substrate 102 is connected to a conductive terminal 1502.

As illustrated in FIG. 15, a plurality of conductive terminals 1502 are disposed on the second surface 102*b* of the substrate 102, in accordance with some embodiments. The conductive terminals 1502 may be electrically coupled to the routing layer 102M. The antenna package structure 1500 may be electrically coupled to a printed circuit board (PCB) or any suitable component (not illustrated) through the conductive terminals 1502. The conductive terminals 1502 may include microbumps, controlled collapse chip connection (C4) bumps, conductive pillars, solder paste, ball grid array (BGA) balls, frame board, the like, or a combination thereof. The conductive terminals 1502 may be formed of metal, including the material similar to that of the conductive connectors 106.

In some embodiments, the conductive terminals 1502 have a thickness greater than the thickness of the molding material 112. The bottom surface of the conductive terminals 1502 may be below the bottom surface of the molding material 112.

In some other embodiments, the conductive terminals 1502 have a thickness less than the thickness of the molding material 112. For example, the conductive terminals 1502 may include solder paste. In these embodiments, the underlying structure (not illustrated), such as a printed circuit board (PCB) connected to the conductive terminals 1502, has a recess to accommodate the molding material 112.

In still other embodiments, the molding material 112 surrounds the conductive terminals 1502 to protect them from damage. For example, the conductive terminals 1502 may include copper pillars. The bottom surfaces of the conductive terminals 1502 may be exposed by the molding material 112 to connect to the underlying structure.

Figure 16:
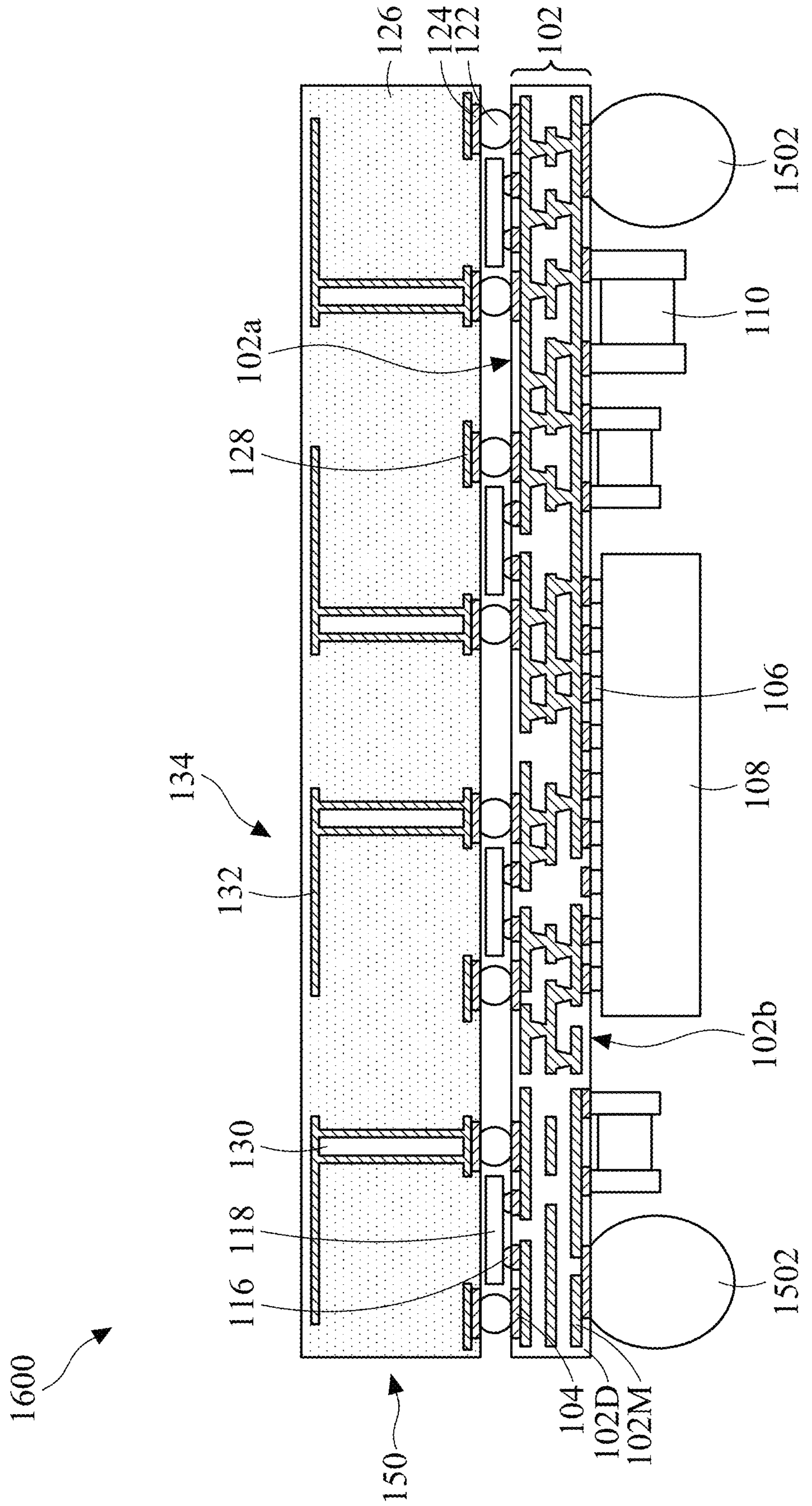

FIG. 16 is a cross-sectional view of an antenna package structure 1600 in accordance with some embodiments of the present disclosure. It should be noted that the antenna package structure 1600 may include the same or similar components as those of the antenna package structure 1500, which is illustrated in FIG. 15, and for the sake of simplicity, those components will not be discussed in detail again. In the following embodiments, the encapsulating material and the molding material are not formed on opposite surfaces 102*a* and 102*b* of the substrate 102.

As illustrated in FIG. 16, the antenna tuners 118, the conductive connectors 122, the communication device 108, and the electronic components 110 are exposed, in accordance with some embodiments. The thicknesses of the antenna tuners 118 may be decreased, or a metal layer may be disposed on the bottom surfaces of the dielectric layers 126 to reduce the silicon die conductivity loss of the antenna tuners 118 caused by the coupling of the main radiator 132, similar to those discussed with reference to FIGS. 3 and 4.

Figure 17:
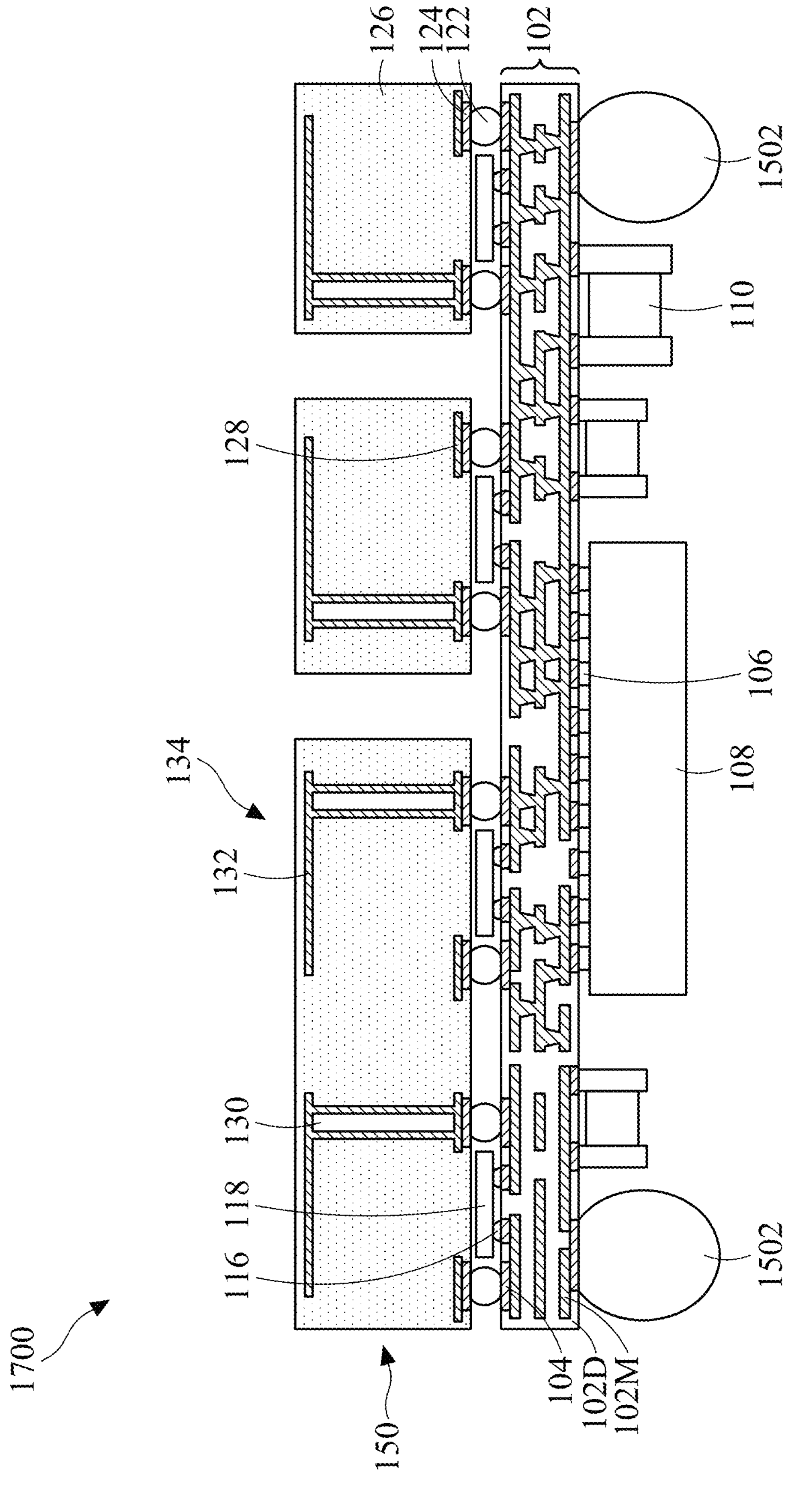

FIG. 17 is a cross-sectional view of an antenna package structure 1700 in accordance with some embodiments of the present disclosure. It should be noted that the antenna package structure 1700 may include the same or similar components as those of the antenna package structure 1600, which is illustrated in FIG. 16, and for the sake of simplicity, those components will not be discussed in detail again. In the following embodiments, the antenna layer 150 includes a plurality of dielectric layers 126.

As illustrated in FIG. 17, the antenna layer 150 includes a plurality of dielectric layers 126 which are discontinuous, in accordance with some embodiments. The dielectric layers 126 may be spaced apart from each other. The dimensions of the dielectric layers 126 (such as the lengths in the direction parallel to the top surface of the dielectric layers 126) may be different, and different numbers of the antenna elements 134 may be disposed in the dielectric layers 126. For example, one or two antenna elements 134 may be disposed in one dielectric layer 126, as shown in FIG. 17. More than two antenna elements 134 may be disposed in one of the dielectric layers 126.

The antenna tuners 118 and the conductive connectors 122 may be exposed. The thicknesses of the antenna tuners 118 may be decreased, or a metal layer may be disposed on the bottom surfaces of the dielectric layers 126 to reduce the silicon die conductivity loss of the antenna tuners 118 caused by the coupling of the main radiator 132, similar to those discussed with reference to FIGS. 3 and 4.

Figure 18:
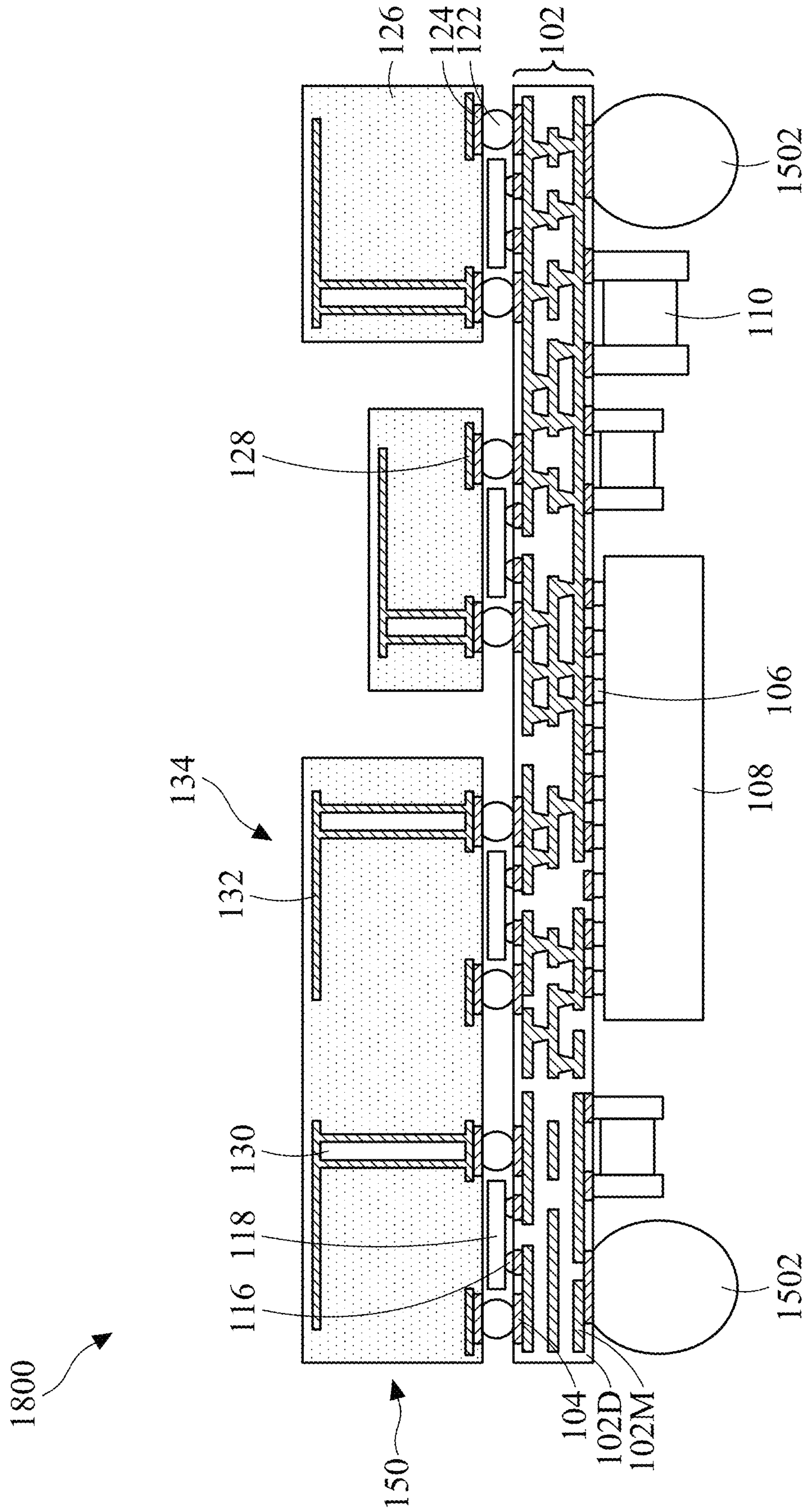

FIG. 18 is a cross-sectional view of an antenna package structure 1800 in accordance with some embodiments of the present disclosure. It should be noted that the antenna package structure 1800 may include the same or similar components as those of the antenna package structure 1700, which is illustrated in FIG. 17, and for the sake of simplicity, those components will not be discussed in detail again. In the following embodiments, the dielectric layers 126 include different thicknesses.

As illustrated in FIG. 18, the dielectric layers 126 may have different thicknesses in the direction vertical to the first surface 102*a* of the substrate 102 may be different. The dimensions of the antenna elements 134 may be different accordingly. For example, the thicknesses of the antenna feeding components 130 in the direction vertical to the first surface 102*a* of the substrate 102 may be different.

The antenna tuners 118 and the conductive connectors 122 may be exposed. The thicknesses of the antenna tuners 118 may be decreased, or a metal layer may be disposed on the bottom surfaces of the dielectric layers 126 to reduce the silicon conductivity loss of the antenna tuners 118 caused by the coupling of the main radiator 132, similar to those discussed with reference to FIGS. 3 and 4.

In summary, the antenna package structure according to the present disclosure includes an antenna layer and an antenna tuner which are stacked vertically. As a result, antenna impedance, frequency, polarization direction, and radiation direction can be modified, and the size of the antenna package structure can be decreased. According to some embodiments, the antenna refer to ground in the substrate can reduce the overall height of the antenna package structure.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna package structure, comprising:
- a substrate;
- an antenna tuner disposed on a top surface of the substrate;
- a communication device disposed on a bottom surface of the substrate; and
- an antenna layer vertically overlapping the antenna tuner and comprising:
- a dielectric layer; and
- an antenna element disposed in the dielectric layer and electrically coupled to the substrate, wherein the antenna element comprises:
- an antenna feeding component; and
- a main radiator disposed over the antenna feeding component.

2. The antenna package structure as claimed in claim 1, further comprising:
- a grounding layer disposed in the substrate.

3. The antenna package structure as claimed in claim 1, further comprising:
- a metal layer disposed on a bottom surface of the dielectric layer and vertically overlapping the antenna tuner.

4. The antenna package structure as claimed in claim 1, further comprising:
- a grounding layer disposed in the dielectric layer.

5. The antenna package structure as claimed in claim 1, further comprising:
- a shielding layer extending on sidewalls of the substrate and the antenna layer.

6. The antenna package structure as claimed in claim 1, wherein the dielectric layer is separated from the antenna tuner.

7. The antenna package structure as claimed in claim 6, further comprising:
- an encapsulating material surrounding the antenna tuner and spacing the antenna tuner away from the dielectric layer.

8. The antenna package structure as claimed in claim 1, wherein the antenna tuner is disposed in a recess of the dielectric layer.

9. The antenna package structure as claimed in claim 1, further comprising:
- a connector or a conductive terminal disposed on the bottom surface of the substrate and electrically coupled to the substrate.

10. An antenna package structure, comprising:
- a substrate;
- an antenna tuner disposed over the substrate;
- a communication device disposed below the substrate; and
- an antenna layer disposed over and separated from the antenna tuner, wherein the antenna layer comprises:
- a plurality of dielectric layers; and a plurality of antenna elements disposed in the dielectric layers and electrically coupled to the substrate, wherein each of the antenna elements comprises:
an antenna feeding component; and
a main radiator disposed over the antenna feeding component.

11. The antenna package structure as claimed in claim 10, wherein the antenna tuner is disposed between two of the antenna elements and partially covered by the antenna elements.

12. The antenna package structure as claimed in claim 10, further comprising:
a molding material surrounding each of the dielectric layers.

13. The antenna package structure as claimed in claim 10, wherein the dielectric layers have different thicknesses and/or lengths.

14. The antenna package structure as claimed in claim 10, further comprising:
a molding material surrounding the antenna feeding component, wherein the main radiator is disposed over the molding material.

15. The antenna package structure as claimed in claim 10, further comprising:
a connector or a conductive terminal adjacent to the communication device.

16. An antenna package structure, comprising:
a substrate;
an antenna tuner disposed on a top surface of the substrate;
a molding material surrounding the antenna tuner;
a main radiator disposed over the molding material and coupled to the substrate; and
an antenna feeding component disposed below the main radiator,
wherein the main radiator partially overlaps the antenna tuner.

17. The antenna package structure as claimed in claim 16, wherein the antenna feeding component is directly below the main radiator,
wherein the antenna feeding component and the antenna tuner are spaced apart by the molding material.

18. The antenna package structure as claimed in claim 17, wherein the antenna feeding component comprises a through via extending through the molding material.

19. The antenna package structure as claimed in claim 16, wherein the antenna feeding component comprises a coupling slot formed on the top surface of the substrate, so that the main radiator is coupled to the substrate by using a technique of slot-coupled feed.

* * * * *